(12) United States Patent
Kageyama et al.

(10) Patent No.: US 8,184,950 B2
(45) Date of Patent: *May 22, 2012

(54) RECORDING APPARATUS OPTICAL DISK AND COMPUTER-READABLE RECORDING MEDIUM

(75) Inventors: Masahiro Kageyama, Hachioji (JP); Tomokazu Murakami, Tokyo (JP); Susumu Yoshida, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 1540 days.

This patent is subject to a terminal disclaimer.

(21) Appl. No.: 11/600,043

(22) Filed: Nov. 16, 2006

(65) Prior Publication Data

US 2007/0058940 A1     Mar. 15, 2007

Related U.S. Application Data

(63) Continuation of application No. 10/843,395, filed on May 12, 2004, now Pat. No. 7,139,468, which is a continuation of application No. 10/843,385, filed on May 12, 2004, now Pat. No. 7,133,596, which is a continuation of application No. 10/843,378, filed on May 12, 2004, now Pat. No. 7,130,529, which is a continuation of application No. 10/843,486, filed on May 12, 2004, now Pat. No. 7,130,530, which is a continuation of application No. 09/793,526, filed on Feb. 27, 2001, now Pat. No. 7,146,093.

(30) Foreign Application Priority Data

Jul. 14, 2000   (JP) ................................. 2000-218709

(51) Int. Cl.
*H04N 5/80* (2006.01)
*H04N 5/76* (2006.01)
*H04N 5/93* (2006.01)
*H04N 5/932* (2006.01)
*H04N 5/77* (2006.01)

(52) U.S. Cl. ........ 386/248; 386/238; 386/353; 386/282; 386/227; 386/217; 386/228

(58) Field of Classification Search ................. 386/227, 386/228, 217, 282, 248, 238, 353
See application file for complete search history.

(56) References Cited

U.S. PATENT DOCUMENTS 4,245,248 A * 1/1981 Netravali et al. ............ 348/400.1
4,821,248 A * 4/1989 Yamasaki ........................ 368/21
5,319,581 A * 6/1994 Sakata et al. ................... 708/111

(Continued)

FOREIGN PATENT DOCUMENTS

JP          9-26330        1/1997

(Continued)

*Primary Examiner* — Helen Shibru
(74) *Attorney, Agent, or Firm* — Antonelli, Terry, Stout & Kraus, LLP.

(57) ABSTRACT

Arrangements including a specifying unit for specifying a local recording time in a location where the data has been recorded, in accordance with in accordance with the data recording time information (REC_TM), the time zone information (TM_ZONE), and the recording time zone information (REC_TM_ZONE) at the data recording time, and wherein the specifying means specifies the local recording time in the location where the data has been recorded, at only a case where the flag indicates that the recording time zone information (REC_TM_ZONE) at the data recording time specifies the time difference from the world standard time (Greenwich Mean Time) in the location where the data has been recorded.

3 Claims, 19 Drawing Sheets

U.S. PATENT DOCUMENTS

| | | | |
|---|---|---|---|
| 5,408,444 A * | 4/1995 | Kita et al. | 368/47 |
| 6,470,140 B1 * | 10/2002 | Sugimoto et al. | 386/248 |
| 6,493,504 B1 | 12/2002 | Date et al. | |
| 6,526,222 B2 * | 2/2003 | Sugimoto et al. | 386/241 |
| 6,529,682 B1 * | 3/2003 | Okada et al. | 386/241 |
| 6,661,966 B1 | 12/2003 | Furuyama et al. | |
| 6,665,491 B1 * | 12/2003 | Okada et al. | 386/240 |
| 7,130,529 B2 * | 10/2006 | Kageyama et al. | 386/241 |
| 7,130,530 B2 * | 10/2006 | Kageyama et al. | 386/241 |
| 7,139,468 B2 * | 11/2006 | Kageyama et al. | 386/246 |
| 7,146,093 B2 * | 12/2006 | Kageyama et al. | 386/318 |
| 7,474,836 B2 * | 1/2009 | Okada et al. | 386/248 |
| 2002/0006269 A1 | 1/2002 | Kageyama et al. | |
| 2004/0208483 A1 | 10/2004 | Kageyama et al. | |
| 2004/0208484 A1 | 10/2004 | Kageyama et al. | |
| 2004/0208485 A1 | 10/2004 | Kageyama et al. | |
| 2004/0208486 A1 | 10/2004 | Kageyama et al. | |
| 2004/0228619 A1 | 11/2004 | Kageyama et al. | |
| 2007/0058938 A1 * | 3/2007 | Kageyama et al. | 386/95 |
| 2007/0058939 A1 * | 3/2007 | Kageyama et al. | 386/95 |
| 2007/0058941 A1 * | 3/2007 | Kageyama et al. | 386/95 |
| 2007/0058942 A1 * | 3/2007 | Kageyama et al. | 386/95 |
| 2007/0065108 A1 * | 3/2007 | Kageyama et al. | 386/95 |

FOREIGN PATENT DOCUMENTS

| | | |
|---|---|---|
| JP | 11-98445 | 4/1999 |
| JP | 11-275494 | 10/1999 |
| JP | 2000-113641 | 4/2000 |
| JP | 2000-134565 | 5/2000 |

* cited by examiner

RECORDING APPARATUS OPTICAL DISK AND COMPUTER-READABLE RECORDING MEDIUM

CROSS-REFERENCE TO RELATED APPLICATIONS

This application is a continuation of U.S. application Ser. No. 10/843,395, filed May 12, 2004 now U.S. Pat. No. 7,139,468, which is a continuation of U.S. application Ser. No. 10/843,385, filed May 12, 2004 (now U.S. Pat. No. 7,133,596), which is a continuation of U.S. application Ser. No. 10/843,378, filed May 12, 2004 (now U.S. Pat. No. 7,130,529), which is a continuation of U.S. application Ser. No. 10/843,486, filed May 12, 2004 (now U.S. Pat. No. 7,130,530), which is a continuation of U.S. application Ser. No. 09/793,526, filed Feb. 27, 2001 now U.S. Pat. No. 7,146,093, which is related to U.S. application Ser. No. 09/369,401, filed Aug. 6, 1999. This application is also related to U.S. application Ser. No. 10/843,370, filed May 12, 2004 (now U.S. Pat. No. 7,133,595). This application relates to and claims priority from Japanese Patent Application No. 2000-218709, filed on Jul. 14, 2000. The entirety of the contents and subject matter of all of the above is incorporated herein by reference.

BACKGROUND OF THE INVENTION

1. Field of the Invention

The present invention relates to a rewritable recording medium, a recorder and a reproducing device, and more particularly to a recording medium storing the data such as dynamic images, still pictures or voices along with the data recording time information, a recorder and a reproducing device for use with the recording medium.

2. Description of the Related Art

A rewritable recording medium of large capacity such as a DVD-RAM or DVD-RW has appeared in the market, and the recorders and the reproducing devices such as a video recorder/player, an audio recorder/player or a camera, along with the technologies for recording the image or voice data, have been developed. The dynamic image data may be typically the coded data in accordance with an MPEG (Moving Picture Experts Group) method as defined in the ISO/IEC11172 standards or ISO/IEC13818 standards. The still picture data may be typically the intraframe coded data (one picture) in accordance with the MPEG method or the coded data in accordance with an JPEG method as defined in the ISO/IEC10918-1 standards. The voice data may be typically the coded data in accordance with the MPEG method or an LPCM (Linear Pulse Coding Modulation) method. For example, in the case where the still picture data having a data size of about 100 Kbytes is recorded on a DVD-RAM having a capacity of 4.7 giga-bytes on one side, the still picture data of as many as about 47000 sheets (=4.7×1000000/100) can be recorded.

When such data is recorded on a recording medium, it is commonly practiced to record the data together with the recording time information to facilitate data reduction or data retrieval at the time of reproduction. For example, a first recording time management method in which the recording time information is multiplexedly recorded along with the image or voice stream data as disclosed in JP-A-2000-113641 specification, and a second recording time management method in which the management information for managing the image or voice stream data is prepared separately, and the recording time information is collectively recorded in that management information, as disclosed in JP-A-2000-134565 specification (U.S. patent application Ser. No. 09/369,401) were proposed. The first and second recording time management methods that have some merits and demerits as will be described later may be generally employed in combination.

Supposing that the recording medium or recorder is used in all the countries of the world, the time zone information indicating the standard time (or time difference from the reference point of site) of an area where the data is recorded is commonly recorded on the recording medium along with the data or data recording time. In this case, the time zone information is not appended to each data, but the total management information (VMGI) for managing all the data on the recording medium is generally provided, including one time zone information.

If it is supposed that the recording medium is mailed throughout the world, or the recorder is used while moving across the frontier, the standard time which is the reference of the recording time may be changed. At this time, there is a desire that the local time of the area where the data is recorded is left on the recording medium in some way.

Also, there is a desire that the time zone information once recorded is changed.

In this case, along with the change of the time zone information, it is necessary that the recording time information is changed (or corrected for time difference) and recorded again on the recording medium, taking into consideration the time difference before and after change of the time zone. With the first recording time management method, it is required to read all the recording time information from the stream data of large data size, correct for time difference and record it again, and this is unpractical in respect of the processing time. On the other hand, with the second recording time management method, all the recording time information is managed singly in the management information, whereby the correction for time difference is easy. However, if the recording time information for all the data is carried in the management information, the management information size becomes large, as described in JP-A-2000-134565 specification. Therefore, generally, the recording time information for part of the data is carried in the management information, and the remaining data is in accordance with the first recording time management method. Accordingly, with the prior art, it is difficult to effect the change of the time zone and the correction for time difference of the data recording time information in a short time without causing any inconsistency in the recording time information between the management information and the stream data.

Also, once the time zone information which is managed in the total management information (VMGI) on the recording medium is changed, the user inconveniently can not know the time (local time) in the area where individual data is recorded.

If the time zone is not changed to prevent such inconsistency, the local time (current time) at the destination of foreign country in travel which the user knows and the time displayed by the recorder/reproducing device are not consistent owing to a time difference, which is less user friendly or inconvenient for the user.

It is an object of the present invention to record the relation between the local standard time and the time zone information of a disk on a recording medium in some format of recording, when the user mails the recording medium to the world over or employs a recorder while moving across the frontier.

It is another object of the invention to provide a recording medium, and a recorder and a reproducing device for use with the recording medium, wherein the recording medium is able to implement a data management method capable of changing the time zone information and correcting the data recording time information for time difference in a short time without causing any inconsistency in the recording time information between the management information and the stream data, or a data management method for reconstructing the local time after changing the time zone, or a data management method for correcting for time difference without changing the time zone.

SUMMARY OF THE INVENTION

To solve the above-mentioned problem, there is provided a recording medium for storing the data comprises the time zone information indicating the standard time in a certain area, the recording time of the data with reference to the standard time in the time zone information, and a difference between the time zone information indicating the standard time in an area where the data is recorded and the time zone information on the recording medium.

There is provided a recording medium for recording at least N (N is an integer greater than or equal to one) pieces of data, the total management information (VMGI) for managing the N pieces of data and the M (M is an integer from 1 to N both inclusive) pieces of data management information (VOB_GI), wherein the total management information (VMGI) has the time zone information (TM_ZONE) indicating the standard time in a representative area where the data is recorded, and the data management information (VOB_GI) has the data recording time information (REC_TM) indicating the time when the data is recorded and the time zone auxiliary information (TM_ZONE_SUB).

A recorder for recording on the recording medium the N (N is an integer greater than or equal to one) pieces of data, the total management information (VMGI) for managing the N pieces of data, and the M (M is an integer from 1 to N both inclusive) pieces of data management information (VOB_GI) comprises means for specifying the time zone information (TM_ZONE) indicating the standard time in a representative area where the data is recorded and setting it in the total management information (VMGI), means for specifying the data recording time information (REC_TM) indicating the time when the data is recorded and setting it in the data management information (VOB_GI), and means for specifying the time zone auxiliary information (TM_ZONE_SUB) and setting it in the data management information (VOB_GI).

A recorder for recording on the recording medium the N (N is an integer greater than or equal to one) pieces of data, the total management information (VMGI) for managing the N pieces of data, and the M (M is an integer from 1 to N both inclusive) pieces of data management information (VOB_GI) comprises means for changing the value (TM_ZONE_0) of the time zone information (TM_ZONE) already set in the total management information (VMGI) to a new value (TM_ZONE_1) and resetting it in the total management information (VMGI), means for calculating a differential value (DELTA_TM_ZONE=TM_ZONE_1−TM_ZONE_0) between the values of the time zone information (VMGI) after and before change, and means for resetting in the data management information (VOB_GI) the value (REC_TM_1) which is the value (REC_TM_0) of the data recording time information (REC_TM) already set in the data management information (VOB_GI) plus or minus the differential value (DELTA_TM_ZONE).

A recorder for recording on the recording medium the N (N is an integer greater than or equal to one) pieces of data, the total management information (VMGI) for managing the N pieces of data, and the M (M is an integer from 1 to N both inclusive) pieces of data management information (VOB_GI) comprises means for changing the value (TM_ZONE_0) of the time zone information (TM_ZONE) already set in the total management information (VMGI) to a new value (TM_ZONE_1) and resetting it in the total management information (VMGI), means for calculating a differential value (DELTA_TM_ZONE=TM_ZONE_1−TM_ZONE_0) between the values of the time zone information (VMGI) after and before change, means for resetting the value (REC_TM_1) which is the value (REC_TM_0) of the data recording time information (REC_TM) already set in the data management information (VOB_GI) plus or minus the differential value (DELTA_TM_ZONE) in the data management information (VOB_GI), and means for resetting the value (TM_ZONE_SUB_1) which is the value (TM_ZONE_SUB_0) of the time zone auxiliary information (TM_ZONE_SUB) already set in the data management information (VOB_GI) plus or minus the differential value (DELTA_TM_ZONE) in the data management information (VOB_GI).

A recorder for recording on the recording medium the N (N is an integer greater than or equal to one) pieces of data, the total management information (VMGI) for managing the N pieces of data, and the M (M is an integer from 1 to N both inclusive) pieces of data management information (VOB_GI) comprises means for specifying the current time zone information (CUR_TM_ZONE) indicating the standard time in an area where the data is recorded, means for reading the time zone information (TM_ZONE) from the total management information (VMGI) recorded on the recording medium, means for specifying the current time (CUR_TM) when the data is recorded, and means for specifying the data recording time information (REC_TM) from the current time (CUR_TM), the current time zone information (CUR_TM_ZONE) and the time zone information (TM_ZONE) and setting it in the data management information (VOB_GI).

A reproducing device for reproducing the data from the recording medium on which the N (N is an integer greater than or equal to one) pieces of data and the M (M is an integer from 1 to N both inclusive) pieces of data management information (VOB_GI) are recorded comprises means for reading the data recording time information (REC_TM) from the data management information (VOB_GI) recorded on the recording medium, means for reading the time zone auxiliary information (TM_ZONE_SUB) from the data management information (VOB_GI), means for specifying and displaying the correction data recording time information (MOD_REC_TM) from the time zone auxiliary information (TM_ZONE_SUB) and the data recording time information (REC_TM), means for selecting the data recorded on the recording medium employing a displayed result, and means for reading and reproducing the data recorded on the recording medium employing a selected result.

A reproducing device for reproducing the data from the recording medium on which the N (N is an integer greater than or equal to one) pieces of data, the total management information (VMGI) for managing the N pieces of data, and the M (M is an integer from 1 to N both inclusive) pieces of data management information (VOB_GI) are recorded comprises means for reading the time zone information (TM_ZONE) from the total management information (VMGI) recorded on the recording medium, means for reading the data recording time information (REC_TM) from the data management information (VOB_GI) recorded on the recording medium, means for reading the time zone auxiliary information (TM_ZONE_SUB) from the data management information (VOB_GI), means for specifying and displaying the correction data recording time information (MOD_REC_TM) from the time zone information (TM_ZONE), the time zone auxiliary information (TM_ZONE_SUB) and the data recording time information (REC_TM), means for selecting the data recorded on the recording medium employing a displayed result, and means for reading and reproducing the data recorded on the recording medium employing a selected result.

A reproducing device for reproducing the data from the recording medium on which the N (N is an integer greater than or equal to one) pieces of data, the total management information (VMGI) for managing the N pieces of data, and the M (M is an integer from 1 to N both inclusive) pieces of data management information (VOB_GI) are recorded comprises means for specifying the current time zone information (CUR_TM_ZONE) indicating the standard time in an area where the data is read and reproduced, means for reading the time zone information (TM_ZONE) from the total management information (VMGI) recorded on the recording medium, means for reading the data recording time information (REC_TM) from the data management information (VOB_GI) recorded on the recording medium, means for specifying and displaying the correction data recording time information (MOD_REC_TM) from the current time zone information (CUR_TM_ZONE), the time zone information (TM_ZONE) and the data recording time information (REC_TM), means for selecting the data recorded on the recording medium employing a displayed result, and means for reading and reproducing the data recorded on the recording medium employing a selected result.

According to the invention, when the user mails the recording medium to the world over, or employs the recorder while moving across the frontier, the relation between the local standard time and the time zone information stored in the disk can be recorded on the recording medium in some way.

Also, according to the invention, the change of the time zone and the correction for time difference of the data recording time information can be made in a short time without causing the inconsistency in the recording time information between the management information and the stream data. Also, the local time can be reproduced after the time zone is changed. Moreover, the correction for time difference can be made without changing the time zone.

DETAILED DESCRIPTION OF THE EMBODIMENTS

The preferred embodiment of the present invention will be described below with reference to the drawings.

Figure 1:
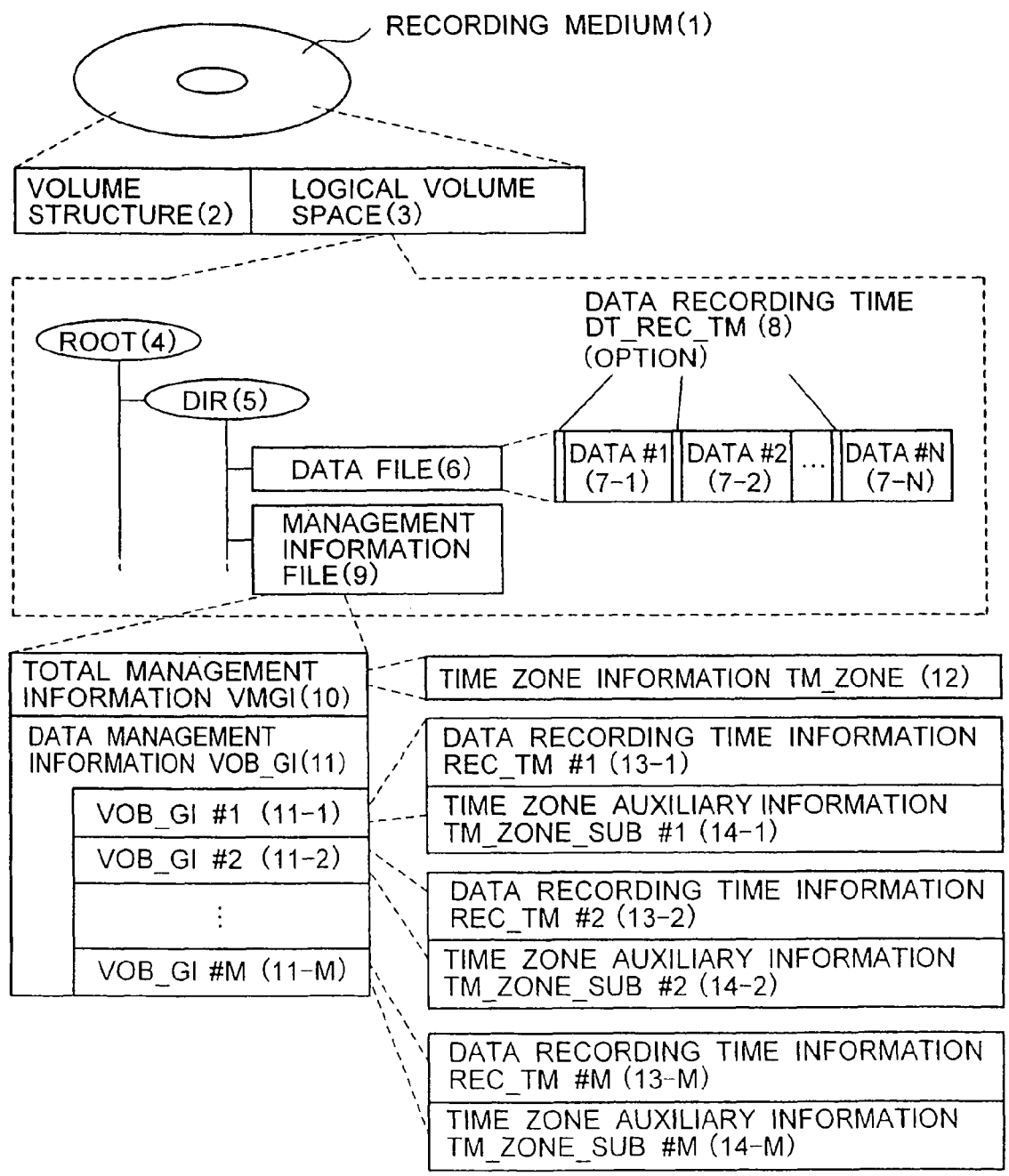
FIG. 1 is a block diagram for showing an embodiment of a recording medium according to the present invention.

FIG. 1 is a block diagram showing an embodiment of a recording medium according to the invention. In FIG. 1, the recording medium (1) is typically comprised of a volume structure (2) indicating the logical structure of the whole recording medium and a logical volume space (3) which is a data recording space under the management of the volume structure (2). The logical volume space (3) is an area for recording the data as a file principally, having a route directory ROOT (4) and a sub-directory DIR (5) under the route directory ROOT (4). It is common that the file is recorded under the sub-directory DIR (5), or directly under the root directory ROOT (4). The recording medium (1) may be typically an optical disk such as a DVD (Digital Versatile Disc), a magneto-optical disk such as an MO, or a magnetic disk such as a HDD (Hard Disc Drive). The volume structure (2), the logical volume space (3), the root directory ROOT (4), the sub-directory DIR (5), and the file management method can be made using the conventional technique of the file system in accordance with the ISO/IEC13346 standards, and therefore the illustration and explanation are omitted. Hence, various kinds of specific files and the data structure of the file will be described below.

First of all, the N (N is an integer greater than and equal to one) pieces of data (7) such as dynamic image data, still picture data or voice data are recorded in one data file (6) collectively. This is a commonly employed method to facilitate the file management. With this method, in the case where the data recording time information DT_REC_TM(8) is recorded at the top of the data (7), like the technique as described in JP-A-2000-113641 specification, the effect of the invention becomes remarkable. For the purpose of being consistent between the case where the data recording time information DT_REC_TM(8) is recorded and the case where it is not recorded, a systematic management information file (9) may be employed. Therefore, the data recording time information DT_REC_TM(8) is not a requisite item to carry out the invention, but may be dealt with optionally. The detailed data structure of the data recording time information DT_REC_TM(8) will be described later. In the following, the data structure of the management information file (9) which is a feature of the present invention will be mainly described below.

The management information file (9) records the information for managing the data (7) collectively, and comprises the total management information VMGI (10) and the data management information VOB_GI(11).

The total management information VMGI(10) manages collectively the items common to all the N pieces of data, and comprises the time zone information TM_ZONE(12) which is a feature of the invention. The time zone information TM_ZONE (12) indicates the standard time of an area where the data is recorded, and may be represented in terms of a time difference between the standard time of the area and the universal time (Greenwich Mean Time) which is indicated by a positive or negative value (e.g., two byes) in a unit of minute, for example. The total management information VMGI(10) may hold, in addition to the time zone information TM_ZONE(12), an identifier to indicate a data management method for use with the management information file (9), the version information, the pointer information to the data management information VOB_GI(11) as will be described later, and the size information of the management information file (9), but because they are not related directly to the gist of the invention, the illustration and explanation are omitted.

The data management information VOB_GI(11) manages the data (7) individually, and comprises the data recording time information REC_TM(13) and the time zone auxiliary information TM_ZONE_SUB(14) which are a feature of the invention. Herein, there are two cases where the data (7) and the data management information VOB_GI(11) are managed in a relation of one-to-one correspondence, or where one data management information VOB_GI(11) is provided for a data group of plural pieces of data (7), like the technique as described in JP-A-2000-134565 specification. Hence, the number (M) of data management information VOB_GI(11) is an integer from one to the number (N) of data (7) both inclusive. In the same figure, #i (i is an integer) denotes an i-th element, and is employed similarly in other figures. The data management information VOB_GI(11) may hold, in addition to the data recording time information REC_TM(13) and the time zone auxiliary information TM_ZONE_SUB(14), the number of data (7) managed by the data management information VOB_GI(11), the pointer information or data size information to have access to individual data, the data reproduction time length information, the text information representing a title associated with the data, and the data attribute information such as an encoding method, the resolution and the sampling frequency when the data (7) is the image or voice, but because they are not related directly to the gist of the invention, the illustration and explanation are omitted.

The data recording time information DT_REC_TM(8) and REC_TM(13) represents the time when the data management information VOB_GI(11) and the corresponding data (7) are recorded on the recording medium (1), on the basis of the standard time indicated by the time zone information TM_ZONE (12), which can be expressed, for example, in terms of a total of 40 bits (=5 bytes) including a year (14 bits), a month (4 bits), a day (5 bits), an hour (5 bits), a minute (6 bits), and a second (6 bits). In the case where one data management information VOB_GI(11) is provided for a data group of plural pieces of data (7), like the technique as described in JP-A-2000-134565 specification, the first data recording time information F_REC_TM (e.g., five bytes) and the last data recording time information L_REC_TM (e.g., five bytes) within the data group are stored (e.g., a total of 10 byes) as the data recording time information REC_TM(13).

The time zone auxiliary information TM_ZONE_SUB (14) will be described below with reference to FIGS. 2 and 3.

Figure 2:
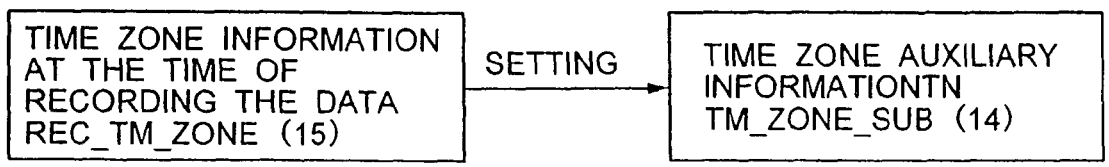
FIG. 2 is an explanatory diagram for showing an operation of the embodiment according to the invention.

FIG. 2 is an operation diagram wherein the time zone information REC_TM_ZONE(15) at the time of recording the data is set as the time zone auxiliary information TM_ZONE_SUB(14). When the data (7) is recorded on the recording medium (1), the time zone information TM_ZONE (12) set in the total management information VMGI(10) is acquired, and the same value
is set in the time zone auxiliary information TM_ZONE_SUB(14) as the time zone information REC_TM_ZONE(15) at the time of recording the data. Thereafter, when the time zone information TM_ZONE(12) within the total management information VMGI(10) is changed, the data recording time information REC_TM(13) in the data management information VOB_GI(11) is only changed, and the time zone auxiliary information TM_ZONE_SUB(14) and the data recording time information DT_REC_TM(8) in the data file (6) are not changed. Thereby, there is no need of reading all the data file (6) of large size, correcting the data recording time DT_REC_TM(8) for time difference, and rewriting all the data, resulting in the faster processing. Further, since the data recording time information DT_REC_TM(8) to which (the value of TM_ZONE(12)–the value of TM_ZONE_SUB (14)) is added must be coincident with the data recording time information REC_TM(13), there is no inconsistency between the information of the data file (6) and the information of the management information file (9). After changing the time zone information TM_ZONE(12), the local standard time at the time of recording the data is recorded in the time zone auxiliary information TM_ZONE_SUB(14), whereby the data recording time information REC_TM(8) after correcting for time difference to which (the value of TM_ZONE_SUB (14)–the value of TM_ZONE(12)) is added can reproduce the local time at the time of recording.

Figure 3:
FIG. 3 is an explanatory diagram for showing an operation of the embodiment according to the invention.

FIG. 3 is an operation diagram wherein the time zone differential information TM_ZONE_DIF(16) at the time of recording the data is set as the time zone auxiliary information TM_ZONE_SUB(14). The time zone differential information TM_ZONE_DIF(16) is a differential value (i.e., the value of REC_TM_ZONE(15)–the value of TM_ZONE(12)) between the time zone information REC_TM_ZONE(15) at the time of recording the data and the time zone information TM_ZONE(12) set in the total management information VMGI(10). Unlike the operation of FIG. 2, when the time zone information TM_ZONE(12) within the total management information VMGI(10) is changed, the data recording time information REC_TM(13) with in the data management information VOB-GI(11) and the time zone differential information TM_ZONE_DIF(16) are changed simultaneously. Thereby, there is no need of reading all the data file (6) of large size, correcting the data recording time DT_REC_TM(8) for time difference and rewriting all the data in the same way as previously described, resulting in the faster processing. Further, the data recording time information DT_REC_TM(8) to which the value of TM_ZONE_SUB(14) is added must be coincident with the data recording time information REC_TM(13), whereby there is no inconsistency in the information between the data file (6) and the management information file (9). Also, after changing the time zone information TM_ZONE(12), if the value of TM_ZONE_ZUB(14) is subtracted from the data recording time information REC_TM(8) after correcting for time difference, the local time at the time of recording the data can be reproduced.

This method has a feature that the time zone differential information TM_ZONE_DIF(16) may remain zero until the time zone information TM_ZONE(12) is changed.

Figure 4:
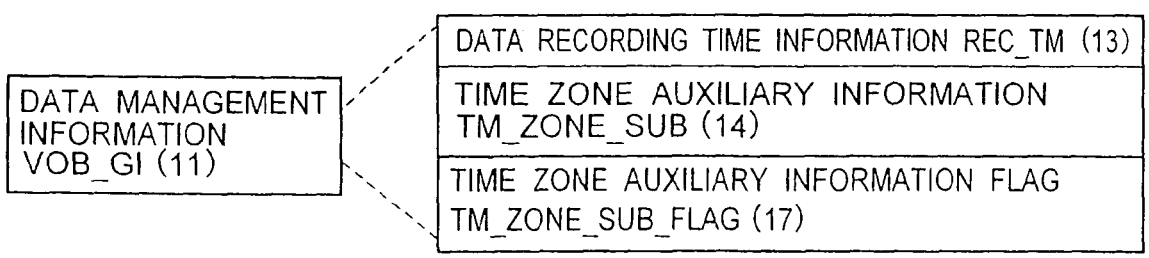
FIG. 4 is a block diagram for showing a variation of the recording medium according to the invention.

FIG. 4 shows a variation of the data management information VOB_GI(11). In the same figure, the data management information VOB_GI(11) carries the data recording time information REC_TM(13) and the time zone auxiliary information TM_ZONE_SUB(14) as described previously, as well as a time zone auxiliary information flag TM_ZONE_SUB_FLAG(17). This flag functions to indicate whether or not the value stored in the data area is effective as the time zone auxiliary information TM_ZONE_SUB(14), when the already reserved data area is used as an area for storing the time zone auxiliary information TM_ZONE_SUB(14). Then, the value is defined as zero when the data area (e.g., two bytes) is in a reserved state. And the most significant bit of the data area is assigned to the time zone auxiliary information flag TM_ZONE_SUB_FLAG(17), and the remaining fifteen bits are assigned to the time zone auxiliary information TM_ZONE_SUB(14). In this way, only if the time zone auxiliary information flag TM_ZONE_SUB_FLAG(17) is 1, the time zone auxiliary information TM_ZONE_SUB(14) can be selectively employed to correct for time difference.

Figure 5:
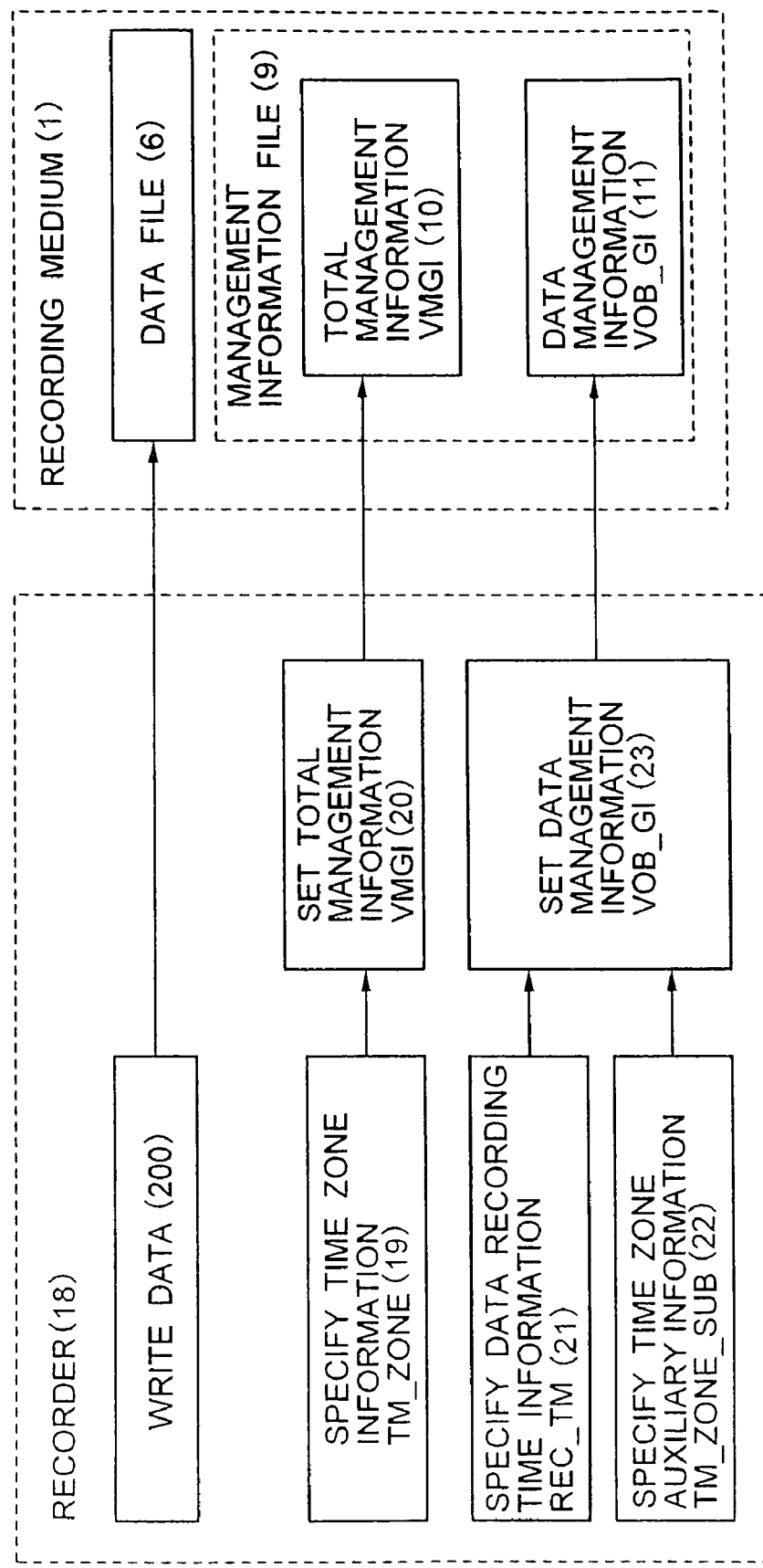
FIG. 5 is a block diagram for showing an embodiment of a recorder according to the invention.

FIG. 5 is a block diagram showing an embodiment of a recorder according to the invention. The recorder (18) is one example of the device having a function of recording newly the data and the management information on the recording medium. First of all, the data file (6) is written onto the recording medium (1) by data writing means (200). Along with this, the time zone information (12) at the time of recording is specified by time zone information TM_ZONE specifying means (19), and the value is set in the total management information VMGI(10) by total management information VMGI setting means (20), and written into the management information file (9) of the recording medium (1). Also, after the data recording time information REC_TM(13) is specified by data recording time information REC_TM specifying means (21), and the time zone auxiliary information TM_ZONE_SUB(14) is specified by time zone auxiliary information TM_ZONE_SUB specifying means (22), a value is set in the data management information VOB_GI(11) by data management information VOB_GI setting means (23) and written into the management information file (9) of the recording medium (1). Herein, the time zone information TM_ZONE specifying means (19) may be implemented by providing the recorder 18 with a switch or a menu screen for selecting one of plural pieces of time zone information (e.g., 2 bytes), for example. The data recording time information REC_TM specifying means (21) can be implemented by generating the REC_TM value (e.g., 5 bytes), employing a timer (clock) progressing in a unit of second, for example. The time zone auxiliary information TM_ZONE_SUB specifying means (22) can be implemented by using the output from the time zone information TM_ZONE specifying means (19) with the method of FIG. 2, or the outputting zero with the method of FIG. 3. The configuration of means (200) (20) (23) for writing the information on the recording medium (1) will be described later.

Figure 6:
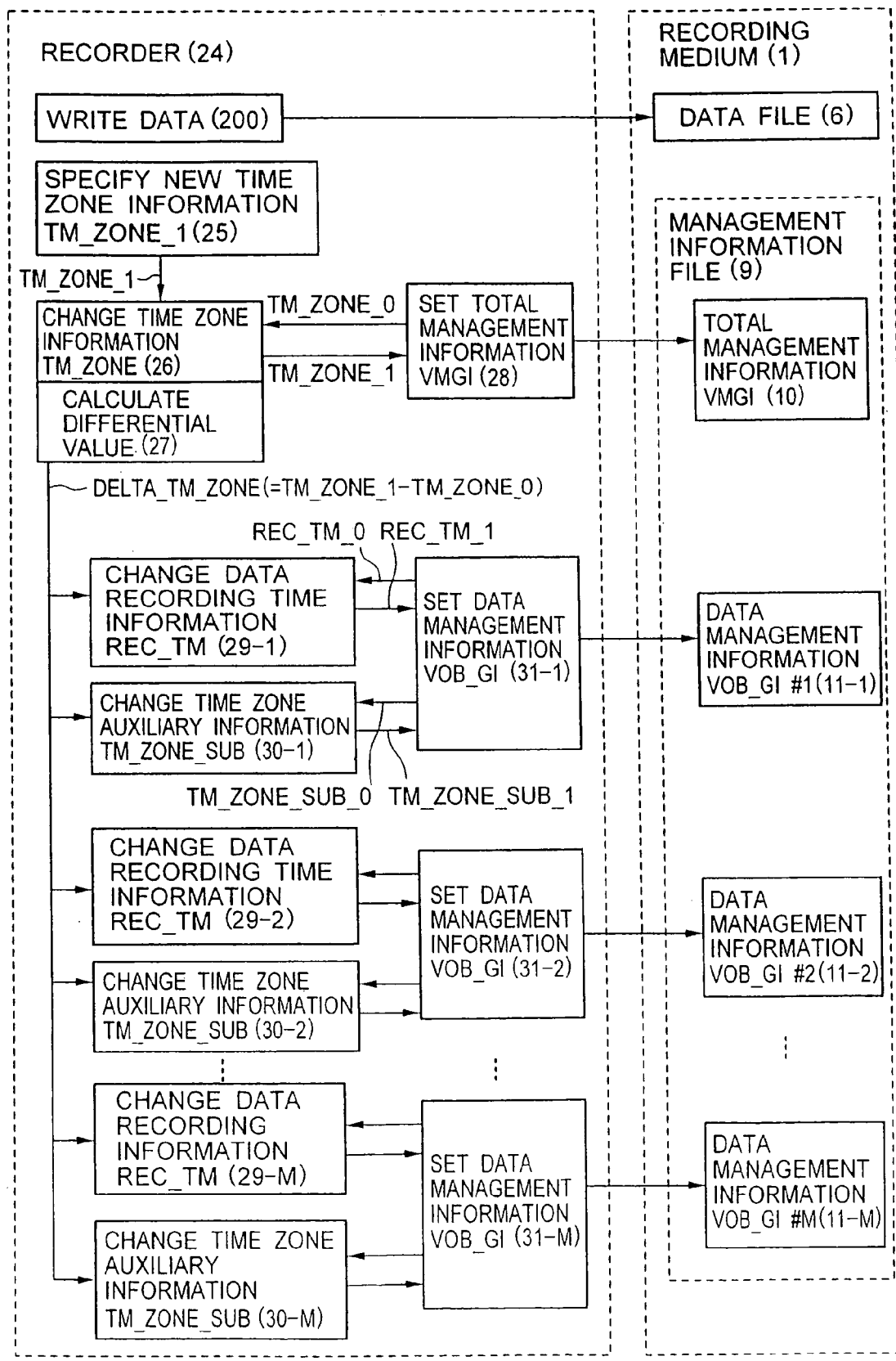
FIG. 6 is a block diagram for showing the embodiment of the recorder according to the invention.

FIG. 6 is a block diagram showing an embodiment of another recorder (24) according to the invention. It is supposed that the recorder (24) carries (caches) the management information already recorded, and is illustrative of the device having a function of changing the time zone information in the management information on the basis of the method as shown in FIG. 3. A section for enabling the data writing means (200) to write the data file (6) on the recording medium (1) has the same configuration as shown in FIG. 5. Employing means (25) for specifying the new time zone information TM_ZONE_1 and the time zone information TM_ZONE changing means (26), the old time zone information TM_ZONE_0 carried in the total management information VMGI setting means (28) is read and changed to the new time zone information TM_ZONE_1, which is then written into the management information file (9) of the recording medium (1). Along with this, a differential value DELTA_TM_ZONE (i.e., TM_ZONE_1−TM_ZONE_0) between the time zone information TM_ZONE before and after change is calculated by differential value calculating means (27), and entered into the data recording time information REC_TM changing means (29-1 to 29-M) and the time zone auxiliary information TM_ZONE_SUB changing means (30-1 to 30-M). Herein, an integer value M signifies the number of data management information VOB_GI. In the data recording time information REC_TM changing means (29-1 to 29-M), the old data recording time information REC_TM_0 carried in the data management information VOB_GI setting means (31-1 to 31-M) is read, and the old data recording time information REC_TM_0 plus the differential value DELTA_TM_ZONE is reset as the new data recording time information REC_TM_1 in the data management information VOB_GI. Also, in the time zone auxiliary information TM_ZONE_SUB changing means (30-1 to 30-M), the old time zone auxiliary information TM_ZONE_SUB_0 is read, and the old time zone auxiliary information TM_ZONE_SUB_0 plus the differential value DELTA_TM_ZONE is reset as the new time zone auxiliary information TM_ZONE_SUB_1 in the data management information VOB_GI. Thereafter, the data management information VOB_GI setting means (31) writes the data management information VOB_GI(11-1 to 11-M) into the management information file (9) of the recording medium (1). Herein, the new time zone information TM_ZONE_1 specifying means (25) may be implemented by providing the recorder (24) with a switch or a menu screen for selecting one of plural pieces of time zone information (e.g., 2 bytes), for example. The configuration of the means (200) (28)(31-1 to 31-M) for writing the information into the recording medium (1) will be described later. Also, it is apparent that the calculation of the differential value DELTA_TM_ZONE may be effective by defining TM_ZONE_0 −TM_ZONE_1, and exchanging addition and subtraction while reversing the signs in the expression. The same applies in the other drawings.

Figure 7:
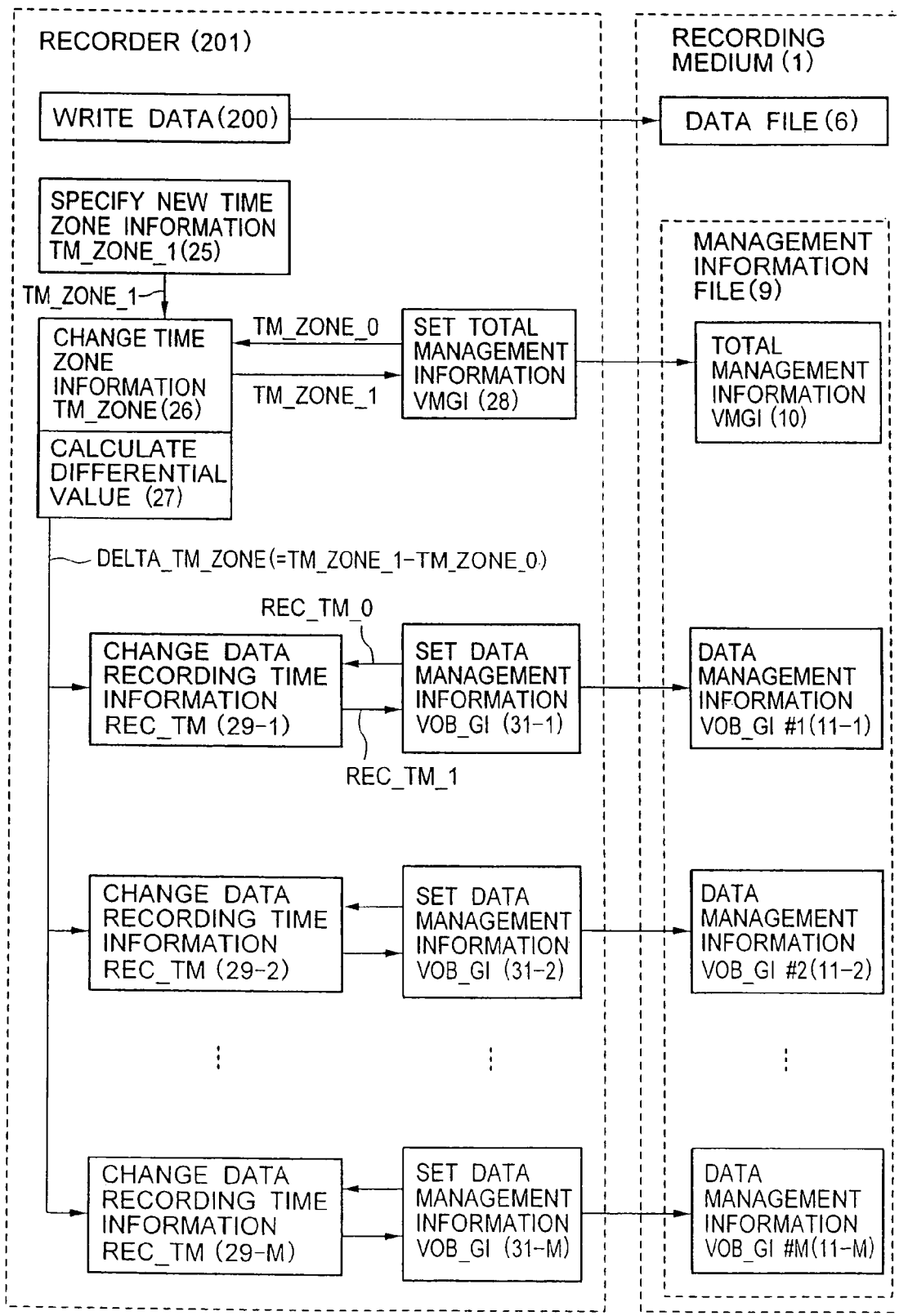
FIG. 7 is a block diagram for showing the embodiment of the recorder according to the invention.

FIG. 7 is a block diagram showing an embodiment of another recorder (201) according to the invention. It is supposed that the recorder (201) carries (caches) the management information already recorded, and is illustrative of the device having a function of changing the time zone information in the management information on the basis of the method as shown in FIG. 2. A section for enabling the data writing means (200) to write the data file (6) on the recording medium (1) has the same configuration as shown in FIG. 5. Employing means (25) for specifying the new time zone information TM_ZONE_1 and the time zone information TM_ZONE changing means (26), the old time zone information TM_ZONE_0 carried in the total management information VMGI setting means (28) is read and changed to the new time zone information TM_ZONE_1, which is then written into the management information file (9) of the recording medium (1). Along with this, a differential value DELTA_TM_ZONE (i.e., TM_ZONE_1−TM_ZONE_0) between the time zone information TM_ZONE before and after change is calculated by differential value calculating means (27), and entered into the data recording time information REC_TM changing means (29-1 to 29-M). Herein, an integer value M signifies the number of data management information VOB_GI. In the data recording time information REC_TM changing means (29-1 to 29-M), the old data recording time information REC_TM_0 carried in the data management information VOB_GI setting means (31-1 to 31-M) is read, and the old data recording time information REC_TM_0 plus the differential value DELTA_TM_ZONE is reset as the new data recording time information REC_TM_1 in the data management information VOB_GI. Thereafter, the data management information VOB_GI setting means (31) writes the data management information VOB_GI(11-1 to 11-M) into the management information file (9) of the recording medium (1). Herein, the new time zone information TM_ZONE_1 specifying means (25) may be implemented by providing the recorder (24) with a switch or a menu screen for selecting one of plural pieces of time zone information (e.g., 2 bytes), for example. The configuration of the means (200)(28)(31-1 to 31-M) for writing the information into the recording medium (1) will be described later.

Figure 8:
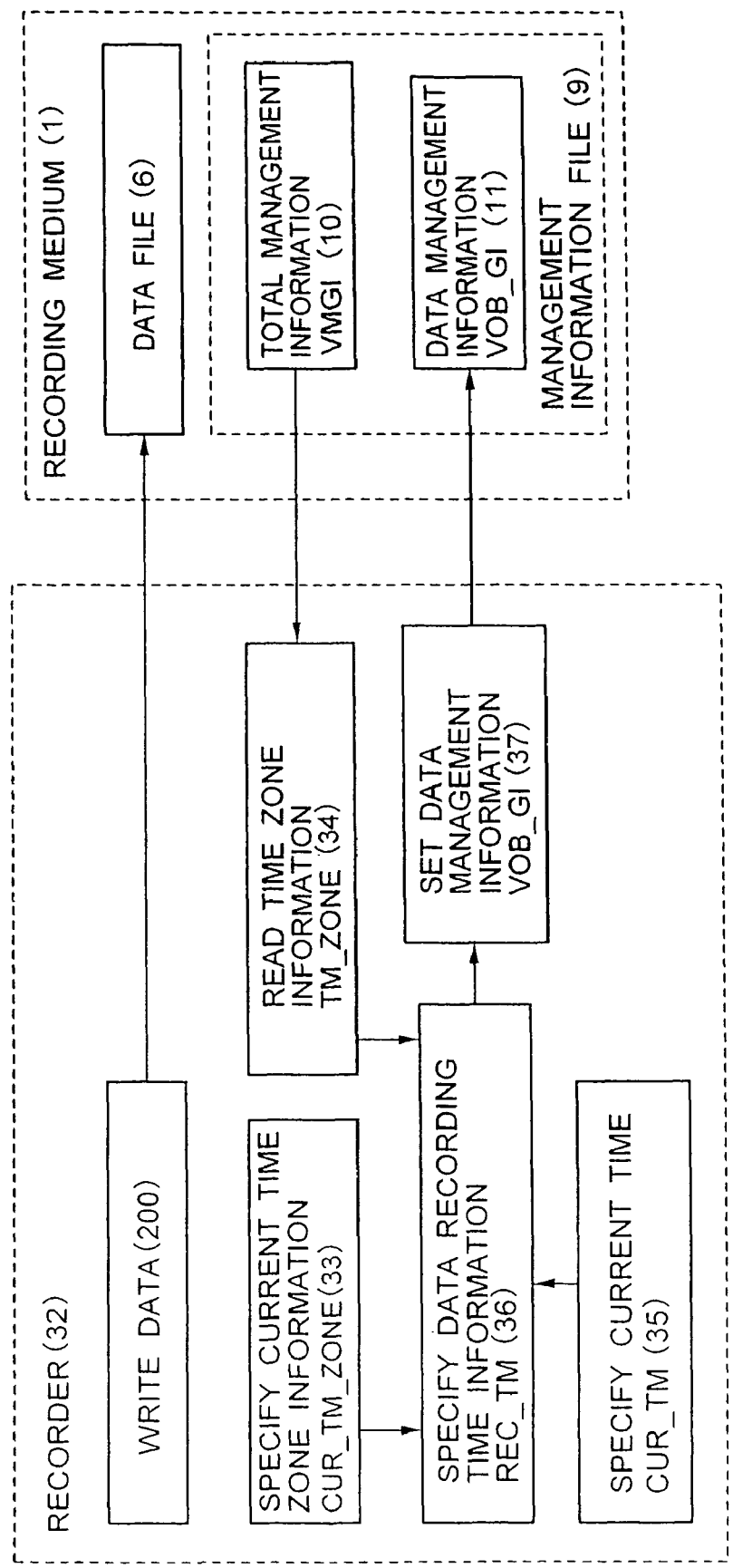
FIG. 8 is a block diagram for showing the embodiment of the recorder according to the invention.

FIG. 8 is a block diagram showing an embodiment of another recorder (32) according to the invention. The recorder (32) is illustrative of the device having a function of specifying the data recording time information REC_TM(13) when recording the data in an area with a time difference from the time zone without changing the time zone information TM_ZONE(12) stored in the management information already recorded. A section for enabling the data writing means (200) to write the data file (6) on the recording medium (1) has the same configuration as shown in FIG. 5. Along with this, there are provided means (33) for specifying the time zone information CUR_TM_ZONE in recording the data (hereinafter referred to as at current time), means (34) for reading the time zone information TM_ZONE from the total management information VMGI(10) of the management information file (9) recorded on the recording medium (1), and means (35) for specifying the current time CUR_TM. Based on a result of output, the data recording time information REC_TM(13) is specified by the data recording time information REC_TM specifying means (36), and set to the data management information VOB_GI(11) by data management information VOB_GI setting means (37) and written into the management information file (9) of the recording medium (1). Herein, the current time zone information CUR_TM_ZONE specifying means (33) may be implemented by providing the recorder (32) with a switch or a menu screen for selecting one of plural pieces of time zone information (e.g., 2 bytes), for example. The current time CUR_TM specifying means (35) can be implemented by generating the CUR_TM value (e.g., 5 bytes), employing a timer (clock) progressing in a unit of second, for example. The data recording time information REC_TM specifying means (36) makes an arithmetic operation of (REC_TM value=CUR_TM value+TM_ZONE value−CUR_TM_ZONE value), and can be implemented by typical addition/subtraction means. The configuration of means (200)(37) for writing the information into the recording medium (1) or means (34) for reading the information from the recording medium (1) will be described later.

The operation of the recorder (32) as shown in FIG. 8 will be described below by way of example. For example, in a situation where the time zone information TM_ZONE(12) in the recording medium (1) indicates the Japanese standard time (universal time+nine hours), it is supposed that the user is moved to Taiwan with a time difference of one hour with respect to Japan. Then, the current time zone information CUR_TM_ZONE is set to Taiwan standard time (universal time+eight hours). If the data is recorded at three in the afternoon (i.e., the current time CUR_TM=15), the data recording time information REC_TM is calculated as REC_TM value=CUR_TM value+TM_ZONE value−CUR_TM_ZONE value=15+9−8=16 in accordance with the previous expression, and recorded on the recording medium (1). Thereby, even if the user records the data at the local current time, the data recording time information REC_TM (13) consistent with the time zone information TM_ZONE (12) can be written on the recording medium (1).

Figure 9:
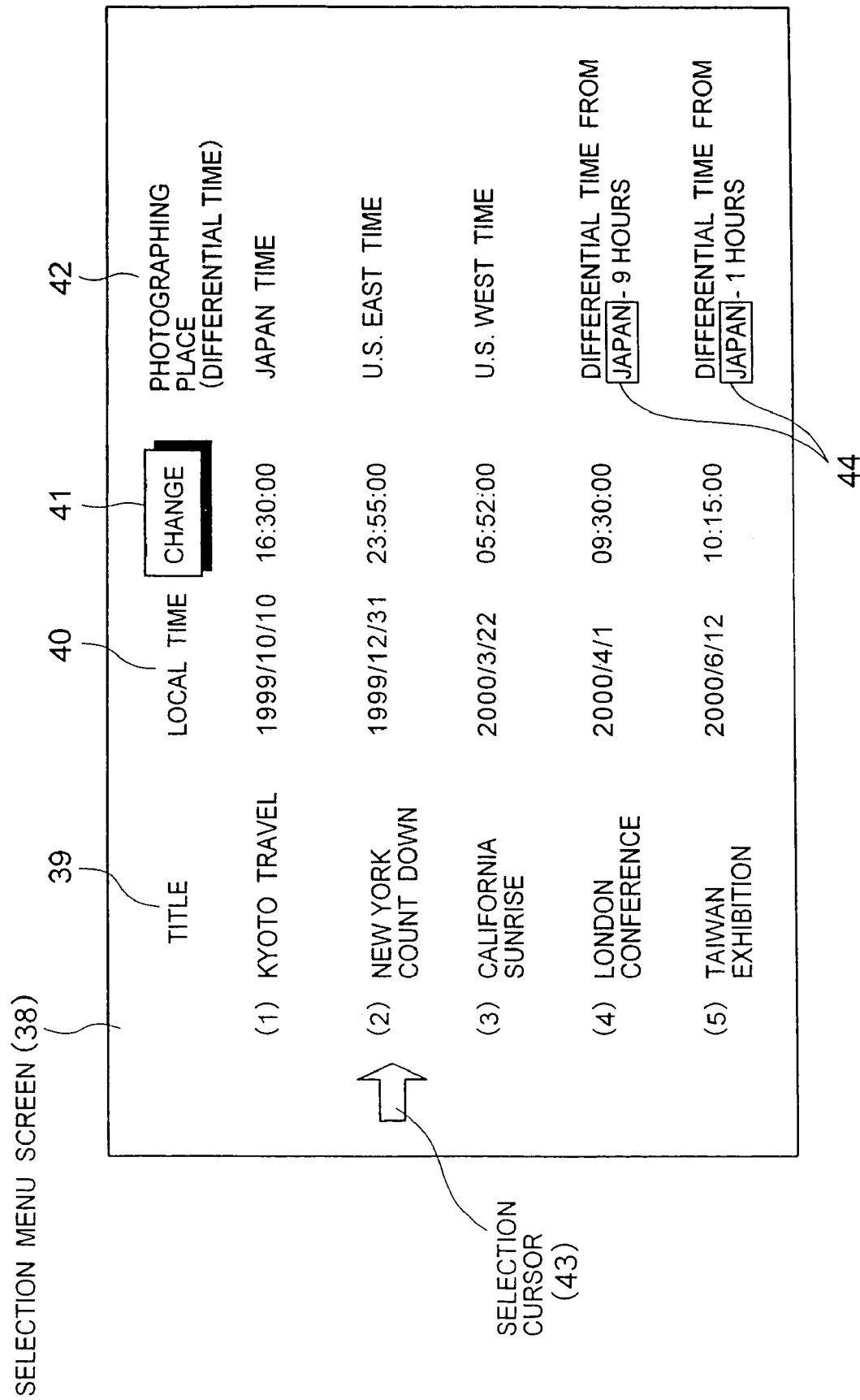
FIG. 9 is a diagram for explaining one example of the operation of a reproducing device according to the invention.

FIG. 9 illustrates one example of the operation of a selection menu screen (38) in a reproducing device according to the invention. The selection menu screen (38) indicates a menu screen displayed on a display terminal dedicated to the reproducing device, or a monitor for the television or personal computer (hereinafter referred to as the PC). A selection cursor (43) is moved in accordance with the user's entry to select a title to be reproduced from among a plurality of titles (39), so that a reproduction instruction can be issued to the reproducing device. Herein, the display of a title can be made using a typical method of recording the text information representing the title in the data management information VOB_GI(11), and reading and displaying it. Therefore, the illustration and explanation are omitted. The features of the invention will be described below.

In FIG. 9, the title (39) and the data recording time are displayed on the selection menu screen (38), wherein it is desirable that the display of data content is more imaginable to the user. Then, the data recording time is preferably the local time (40) when the user records the data, and naturally contains a time difference depending on the area for photographing. If the information as shown in FIG. 2 or 3 is set as the time zone auxiliary information TM_ZONE_SUB(14), employing the management information file (9) as shown in FIG. 1, the data recording time (40) in the actual location can be reproduced, as previously described. A change button (41) is displayed on the screen or equipped in the reproducing device, as required, to switch the data recording time information (13) recorded on the recording medium (1) and the local time (40) to be displayed. A photographing place (42) can be easily displayed by specifying it on the basis of a difference (i.e., differential time) between the data recording time information (13) and the local time (40), if a table of correspondence between the differential time and the place is prepared in a solid-state memory. Also, a representative city name (44) which is a basis of the differential time may be displayed by specifying it from the time zone information TM_ZONE(12) recorded on the recording medium (1).

Figure 10:
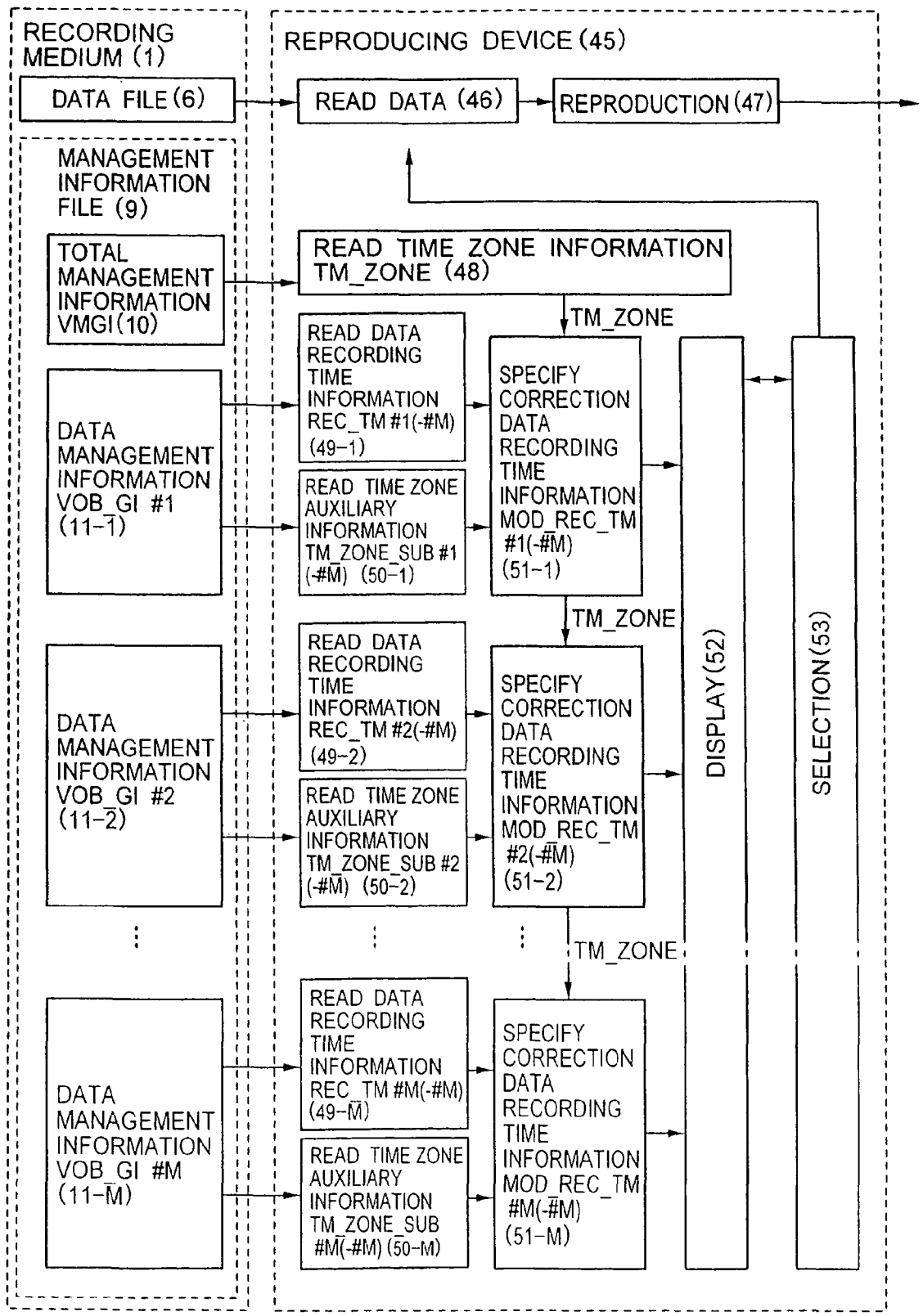
FIG. 10 is a block diagram for showing an embodiment of the reproducing device according to the invention.

FIG. 10 is a block diagram showing an embodiment of a reproducing device (45) according to the invention. The reproducing device (45) has a function of specifying and displaying the local time (40) as shown in FIG. 9, using the management information based on the method as shown in FIG. 2. First of all, the time zone information TM_ZONE(12) is read from the total management information VMGI(10) in the management information file (9) recorded on the recording medium (1) by the time zone information TM_ZONE reading means (48), and input into the correction data recording time information MOD_REC_TM specifying means (51-1 to 51-M). On the other hand, the data recording time information REC_TM(13-1 to 13-M) is read from the data management information VOB_GI(11-1 to 11-M) in the management information file (9) recorded on the recording medium (1) by the data recording time information REC_TM reading means (49-1 to 49-M), and the time zone auxiliary information TM_ZONE_SUB(14-1 to 14-M) is read by the time zone auxiliary information TM_ZONE_SUB reading means (50-1 to 50-M), and input into the correction data recording time information MOD_REC_TM specifying means (51-1 to 51-M). In the correction data recording time information MOD_REC_TM specifying means (51-1 to 51-M), an arithmetic operation of (MOD_REC_TM value=REC_TM value+TM_ZONE_SUB value−TM_ZONE value) is made to obtain the correction data recording time information MOD_REC_TM. In the display means (52), the correction data recording time information MOD_REC_TM is displayed as the local time (40), and the selection cursor (43) is displayed and the selected result is acquired in the selecting means (53). Based on its selected result, the data file (6) is selectively read from the recording medium (1) by the data reading means (46), and reproduced and output as the image or voice by the reproducing means (47). The configuration of reading means (46)(48)(49-1 to 49-M) (50-1 to 50-M) of the information from the recording medium (1) and the reproducing means (47) will be described later.

Figure 11:
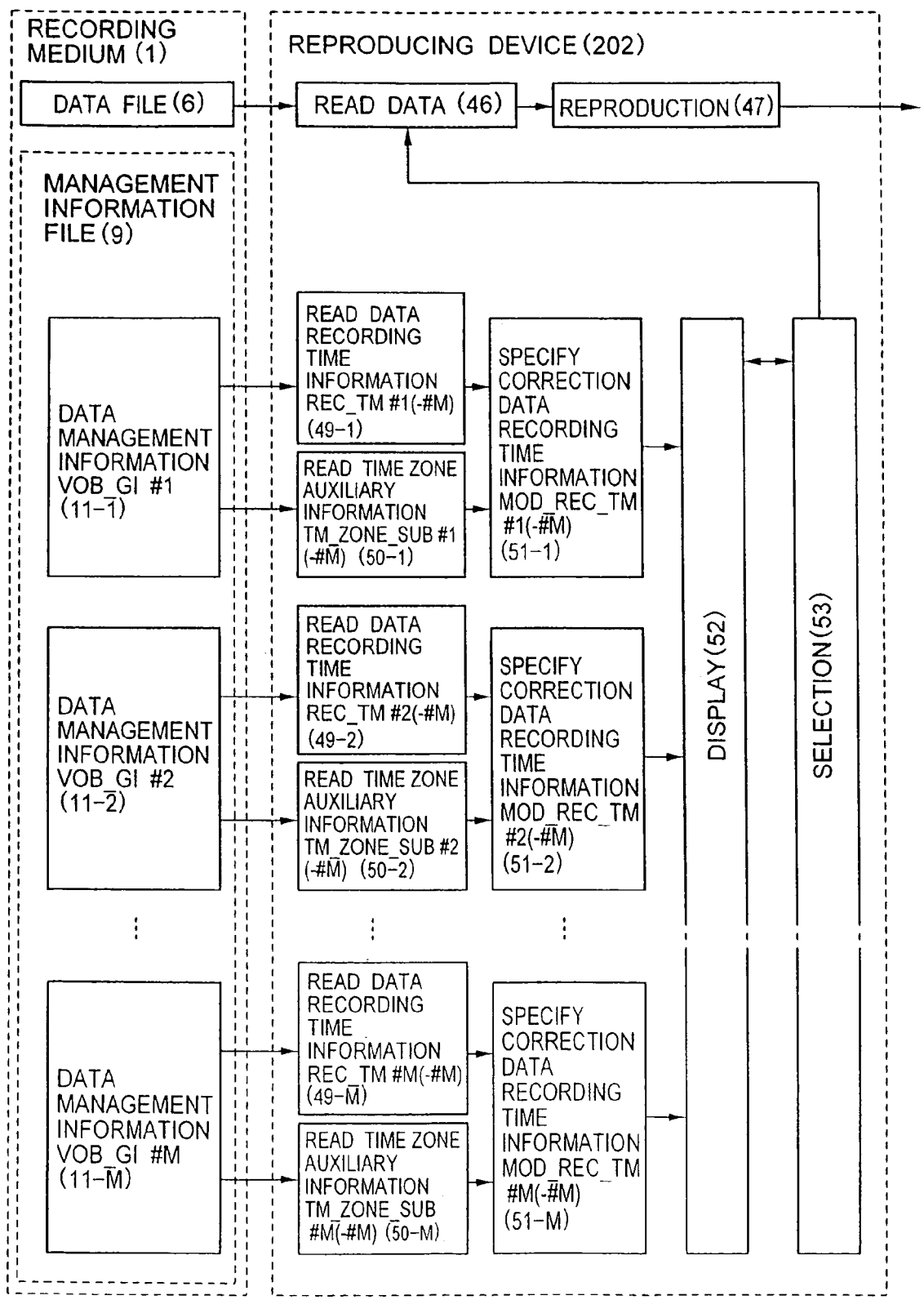
FIG. 11 is a block diagram for showing the embodiment of the reproducing device according to the invention.

FIG. 11 is a block diagram showing an embodiment of a reproducing device (202) according to the invention. The reproducing device (202) has a function of specifying and displaying the local time (40) as shown in FIG. 9, using the management information based on the method as shown in FIG. 3. First of all, the data recording time information REC_TM(13-1 to 13-M) is read from the data management information VOB_GI(11-1 to 11-M) in the management information file (9) recorded on the recording medium (1) by the data recording time information REC_TM reading means (49-1 to 49-M), and the time zone auxiliary information TM_ZONE_SUB(14-1 to 14-M) is read by the time zone auxiliary information TM_ZONE_SUB reading means (50-1 to 50-M), and input into the correction data recording time information MOD_REC_TM specifying means (51-1 to 51-M). In the correction data recording time information MOD_REC_TM specifying means (51-1 to 51-M), an arithmetic operation of (MOD_REC_TM value=REC_TM value+TM_ZONE_SUB value) is made to obtain the correction data recording time information MOD_REC_TM. In the display means (52), the correction data recording time information MOD_REC_TM is displayed as the local time (40), and the selection cursor (43) is displayed and the selected result is acquired in the selecting means (53). Based on its selected result, the data file (6) is selectively read from the recording medium (1) by the data reading means (46), and reproduced and output as the image or voice by the reproducing means (47). The configuration of reading means (46)(48) (49-1 to 49-M) (50-1 to 50-M) of the information from the recording medium (1) and the reproducing means (47) will be described later.

Figure 12:
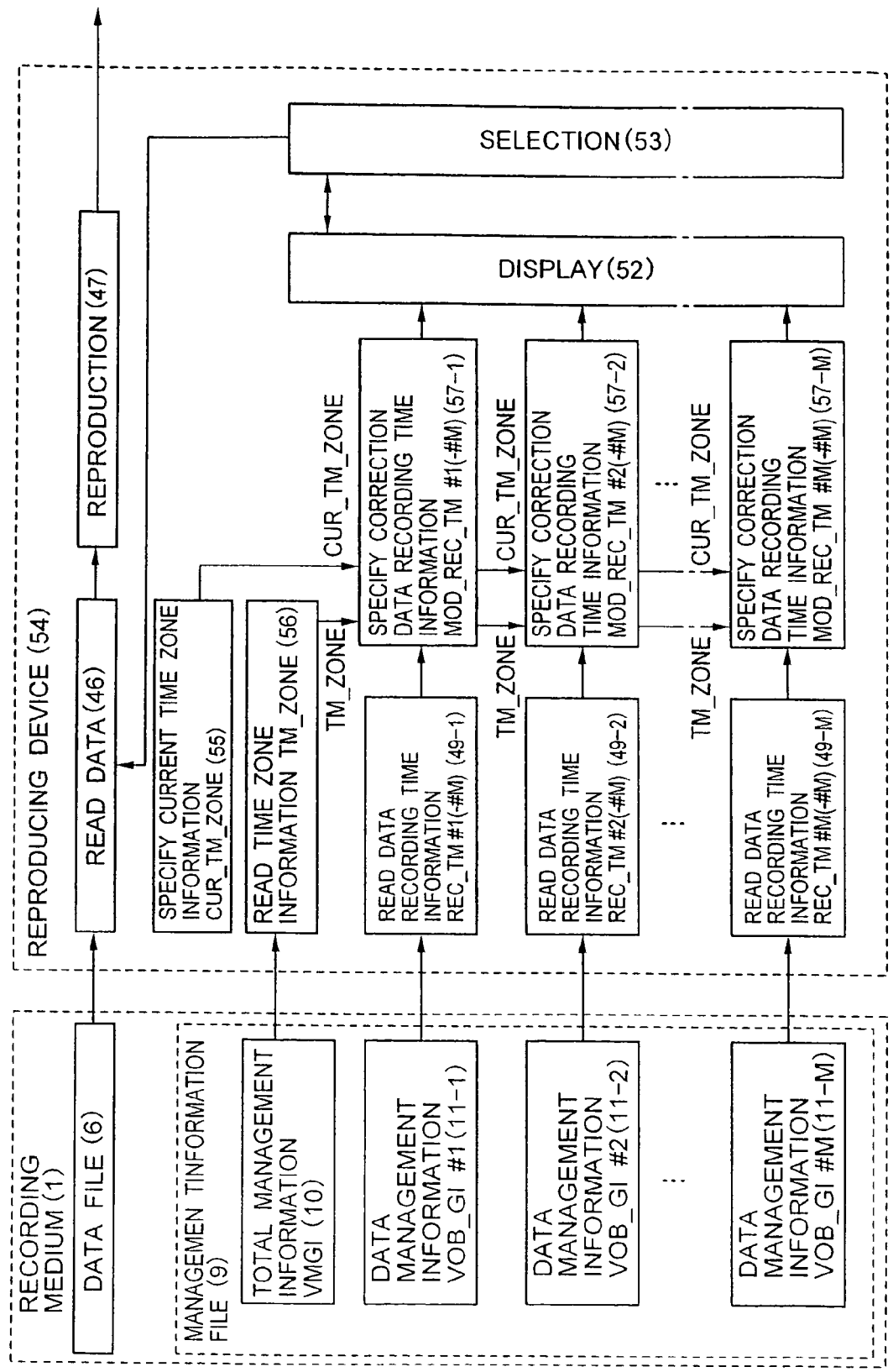
FIG. 12 is a block diagram for showing the embodiment of the reproducing device according to the invention.

FIG. 12 is a block diagram showing an embodiment of a reproducing device (54) according to the invention. The reproducing device (54) has a function of displaying the data recording information REC_TM(13) recorded on the recording medium (1) by modifying the differential time using the current time zone information CUR_TM_ZONE set within the device. First of all, the current time zone information CUR_TM_ZONE is specified by the current time zone information CUR_TM_ZONE specifying means (55), and input into the correction data recording time information MOD_REC_TM specifying means (51-1 to 51-M), as will be described later. Herein, the current time zone information CUR_TM_ZONE specifying means (55) may be implemented by providing the reproducing device (54) with a switch or a menu screen for selecting one of plural pieces of time zone information (e.g., 2 bytes), for example. On the other hand, the time zone information TM_ZONE(12) is read from the total management information VMGI(10) in the management information file (9) recorded on the recording medium (1) by the time zone information TM_ZONE reading means (56), and input into the correction data recording time information MOD_REC_TM specifying means (57-1 to 57-M), as will be described later. Also, the data recording time information REC_TM(13-1 to 13-M) is read from the data management information VOB_GI(11-1 to 11-M) in the management information file (9) recorded on the recording medium (1) by the data recording time information REC_TM reading means (49-1 to 49-M), and input into the correction data recording time information MOD_REC_TM specifying means (57-1 to 57-M). In the correction data recording time information MOD_REC_TM specifying means (57-1 to 57-M), an arithmetic operation of (MOD_REC_TM value=REC_TM value+CUR_TM_ZONE_SUB value−TM_ZONE value) is made to obtain the correction data recording time information MOD_REC_TM. In the display means (52), the correction data recording time information MOD_REC_TM is displayed as the local time (40), and the selection cursor (43) is displayed and the selected result is acquired in the selecting means (53). Based on its selected result, the data file (6) is selectively read from the recording medium (1) by the data reading means (46), and reproduced and output as the image or voice by the reproducing means (47). The configuration of reading means (46)(56)(49-1 to 49-M) of the information from the recording medium (1) and the reproducing means (47) will be described later.

Figure 13:
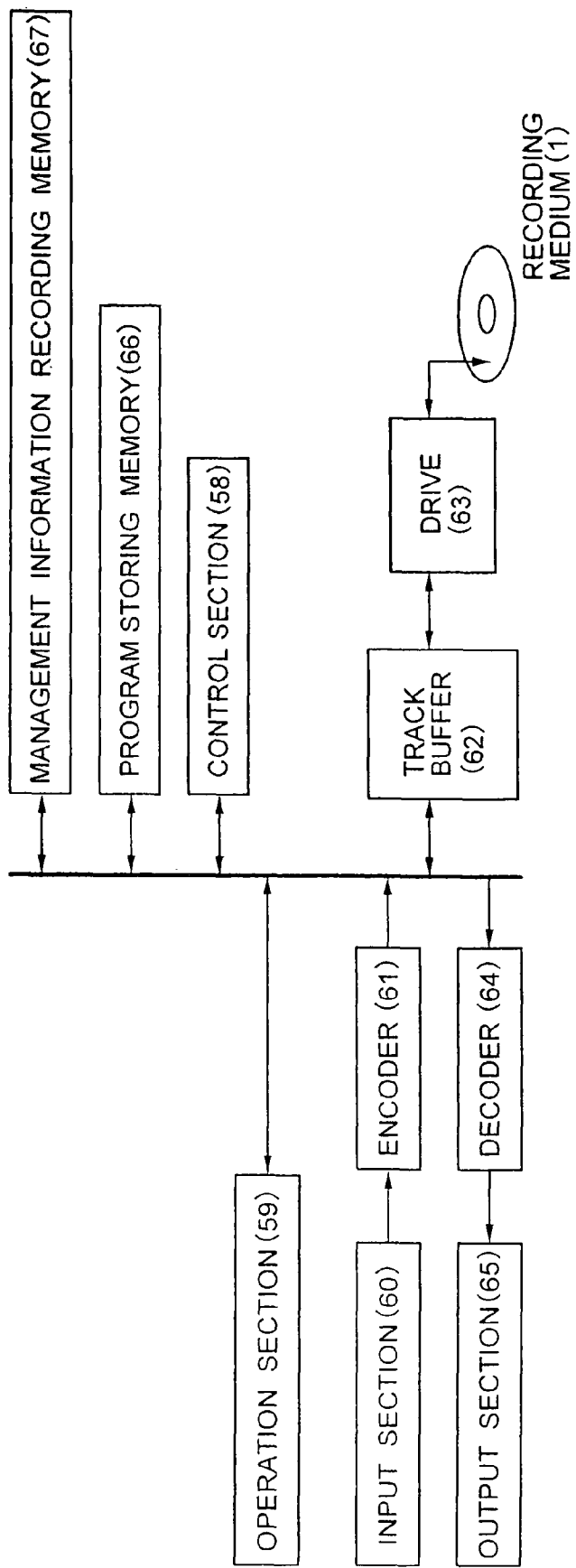
FIG. 13 is a block diagram for showing an embodiment of a recorder/reproducing device according to the invention.
Figure 14:
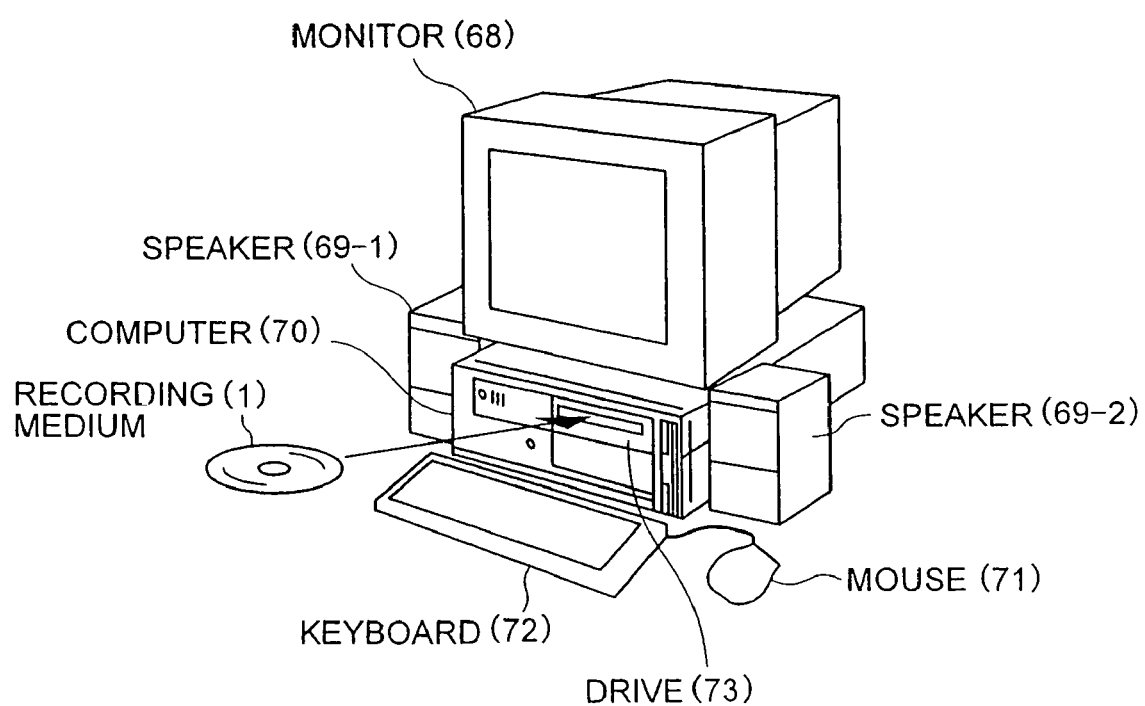
FIG. 14 is a perspective view for illustrating the embodiment of the recorder/reproducing device according to the invention.

FIGS. 13 and 14 are a block diagram and a perspective view showing an embodiment of a recorder/reproducing device according to the invention, respectively. The recorder/reproducing device may be configured to be a special-purpose hardware, or control a general-purpose hardware for the personal computer in accordance with a control procedure (hereinafter referred to as a program) as will be described later. In any case, a control section (58) operates on the basis of a memory (66) storing the program. The memory (66) storing the program may use the same recording medium as a memory (67) storing the management information as will be described later, or they may be differently configured such that the memory (66) may be a recording medium which is unsuitable for frequently rewriting the data such as a read only memory (ROM) or a flash memory, and the memory (67) may be a recording medium which is suitable for frequently rewriting the data such as a DRAM (Dynamic Random Access Memory) or an SRAM (Static Random Access Memory). The content (program) of the memory (66) storing the program may be preinstalled by the device manufacturer before shipment of the device, or read from another recording medium (computer readable recording medium) storing the program before operation of the device, as shown in FIG. 14.

The recorder/reproducing device as shown in FIG. 13 first accepts an operation instruction from the user on an operation section (59), and the control section (58) controls the operation of each section as will be described later. At the time of recording, a signal of image or voice is input from an input section (60), and encoded in accordance with the MPEG by an encoder (59). The encoded data such as the dynamic image, still picture or voice is input via a track buffer (62) into a drive (63), and recorded on the recording medium (1). Then, the management information as shown in FIGS. 1 to 4 is also recorded under the control of the control section (58). The management information is difficult to record at the same time while the encoded data is recorded in real time. Hence, the management information may be once recorded in the memory (67) storing the management information, and recorded on the recording medium (1) after the end of recording the encoded data.

At the time of reproduction, after the management information is once read from the recording medium (1) into the memory (67) by the drive (63), the encoded data is read on the basis of its information and input into the track buffer (62). The encoded data from the track buffer (62) is decoded by a decoder (64), and output from an output section (65). Each section as shown in the same figure can be easily realized by the well-known technique. The detailed illustration and explanation of operation are omitted.

FIG. 14 illustrates one example in which the recorder/reproducing device is constituted using a computer. In FIG. 14, the recorder/reproducing device comprises a computer main unit (70), a monitor (68) for displaying the image, a speaker (69) for outputting the voice, a mouse (71) and a keyboard (72) for inputting an operation instruction from the user, and a drive (73) for recording or reproducing the data onto or from the recording medium (1). The recording medium (1) stores a program for controlling the computer (70), and a reading operation (install) of reading the program into the memory (66) within the computer via the drive (73) may be performed, before operating the recorder/reproducing device. The computer readable recording medium (1) may be a rewritable recording medium such as DVD-RAM, MO, or a floppy disk to record the program on the same medium as the data such as the image or voice, or may be a reproduction dedicated disk such as CD-ROM or DVD-ROM.

The recorder, the reproducing device, and the selection menu screen as previously described and shown in FIGS. 5 to 12 may be replaced in configuration with the recorder/reproducing device as shown in FIGS. 13 and 14. Also, the writing means (200)(20)(23)(28)(31-1 to 31-M)(37) for writing the information into the recording medium (1) or the reading means (34)(46)(48) (49-1 to 49-M) (50-1 to 50-M)(56) for reading the information from the recording medium (1) correspond to the drive (63)(73) as shown in FIGS. 13 and 14, and the reproducing means (47) corresponds to the decoder (64) as shown in FIG. 13.

The recording method and the reproducing method of the invention will be described below in connection with the operation (i.e., the content of program) of the control section (58) as shown in FIG. 13. The name and structure of the management information are the same as those shown in FIG. 1.

Figure 15:
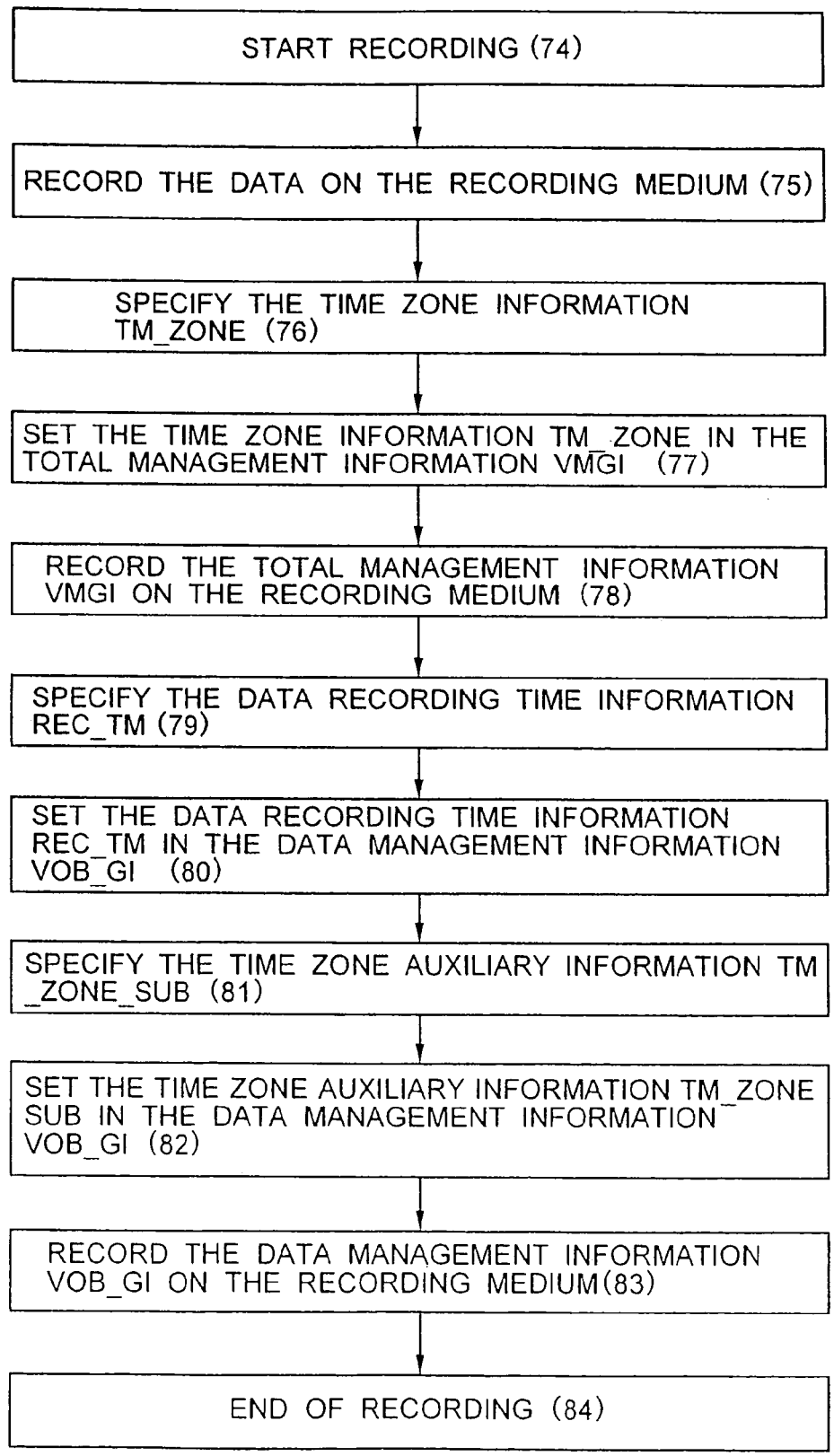
FIG. 15 is a diagram showing one example of a recording method for use with the invention.

FIG. 15 shows a method for embodying the operation of the recorder as shown in FIG. 5 with a program as one example of the recording method for use with the invention. In FIG. 15, the recording operation is started at step (74). Then the data such as the image or voice is recorded on the recording medium at step (75), as previously described and shown in FIG. 13. Subsequently, the time zone information TM_ZONE (12) is specified at step (76). Then, the time zone information TM_ZONE (12) is set in the total management information VMGI(10) at step (77). The total management information VMGI(10) is recorded on the recording medium (1) at step (78). On the other hand, the data recording time information REC_TM(13) is specified at step (79), and set in the data management information VOB_GI(11) at step (80). Also, the time zone auxiliary information TM_ZONE_SUB(14) is specified at step (81), and is set in the data management information VOB_GI(11) at step (82). Lastly, the data management information VOB_GI(11) is recorded on the recording medium (1) at step (83). Then the recording is ended at step (84). Herein, the time zone information TM_ZONE (12) at step (76) can be specified by selecting one of plural pieces of time zone information (e.g., two-byte value) and storing it in the memory, for example. The data recording time information REC_TM(13) at step (79) can be specified by generating the REC_TM value (e.g., five-byte value) with a timer (clock) which can progress in a unit of second, for example. The time zone auxiliary information TM_ZONE_SUB(14) at step (81) can be specified by outputting the value of the time zone information TM_ZONE(12) directly with the method as shown in FIG. 2, or outputting zero with the method as shown in FIG. 3.

Figure 16:
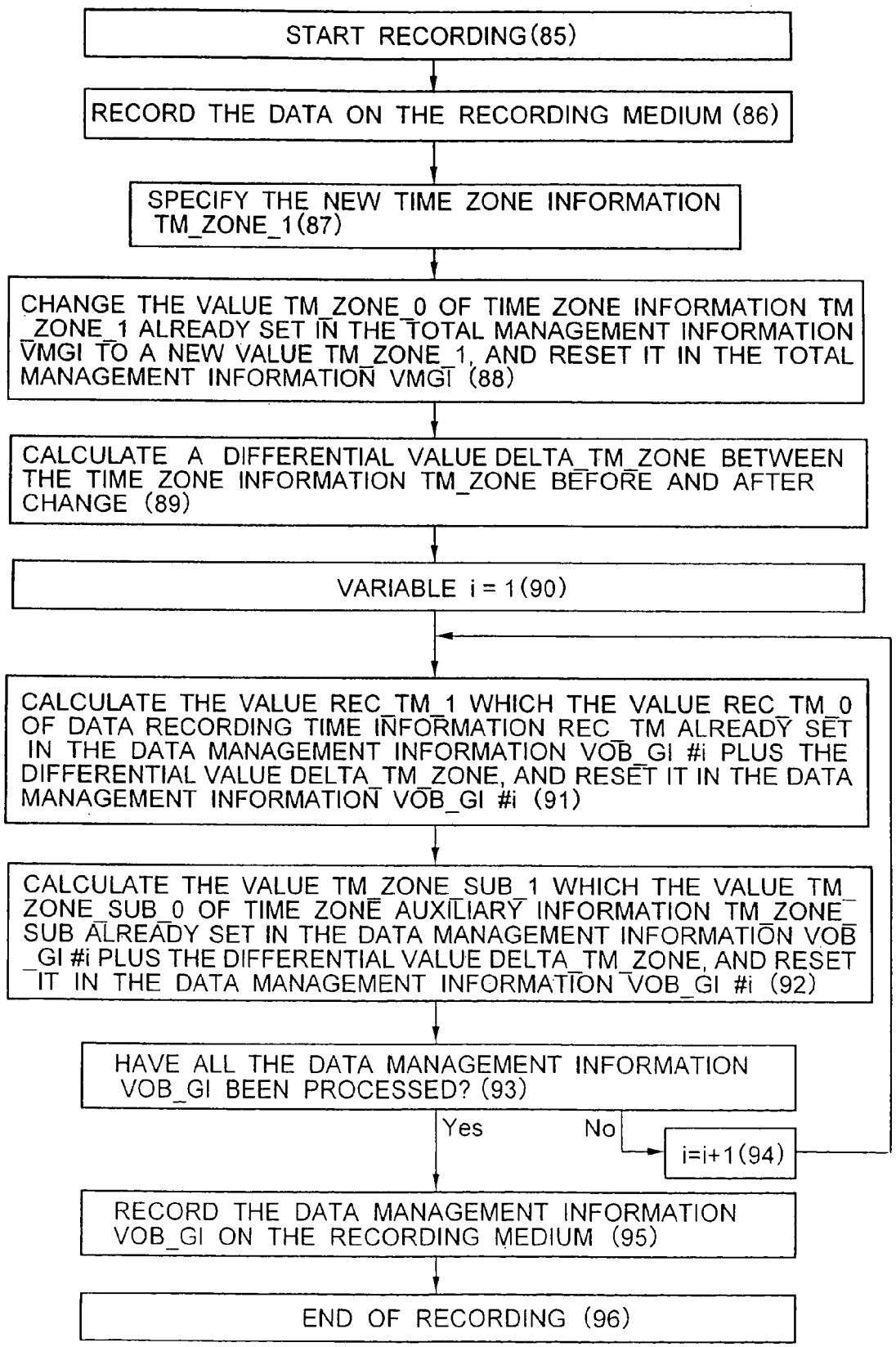
FIG. 16 is a diagram showing one example of the recording method for use with the invention.

FIG. 16 shows a method for embodying the operation of the recorder as shown in FIG. 6 with a program as one example of the recording method for use with the invention. In FIG. 15, the recording operation is started at step (85). Then the data such as the image or voice is recorded on the recording medium at step (86), as previously described and shown in FIG. 13. Subsequently, the new time zone information TM_ZONE_1 is specified at step (87). Then, the value (TM_ZONE_0) of the time zone information TM_ZONE (12) already set in the total management information VMGI(10) is changed to the new value (TM_ZONE_1) which is then reset in the total management information VMGI(10) at step (88). Along with this, the differential value DELTA_TM_ZONE (i.e., TM_ZONE_1−TM_ZONE_0) between the time zone information TM_ZONE before and after change is calculated at step (89). A variable i is prepared, and initialized to 1 at step (90). Then, the loop process is entered. At step (91), the value REC_TM_1 which is the value REC_TM_0 of the data recording time information REC_TM(13) already set in the i-th data management information VOB_GI(11) plus the differential value DELTA_TM_ZONE is calculated, and reset in the data management information VOB_GI(11). At step (92), the value TM_ZONE_SUB_1 which is the value TM_ZONE_SUB_0 of the time zone auxiliary information TM_ZONE_SUB(14-*i*) already set in the i-th data management information VOB_GI(11-*i*) plus the differential value DELTA_TM_ZONE is calculated, and reset in the data management information VOB_GI(11-*i*). At step (93), it is determined whether or not all the data management information VOB_GI(11-*i*) is processed. If all processed, the operation proceeds to step (95), or otherwise, the value of the variable i is incremented by 1 at step (94), and the operation transfers to step (91). Lastly, the data management information VOB_GI (11) is recorded on the recording medium (1) at step (95). The recording is ended at step (96). Herein, the new time zone information TM_ZONE_1 at step (87) can be specified by selecting one of plural pieces of time zone information (e.g., two-byte value) and storing it in the memory, for example.

Figure 17:
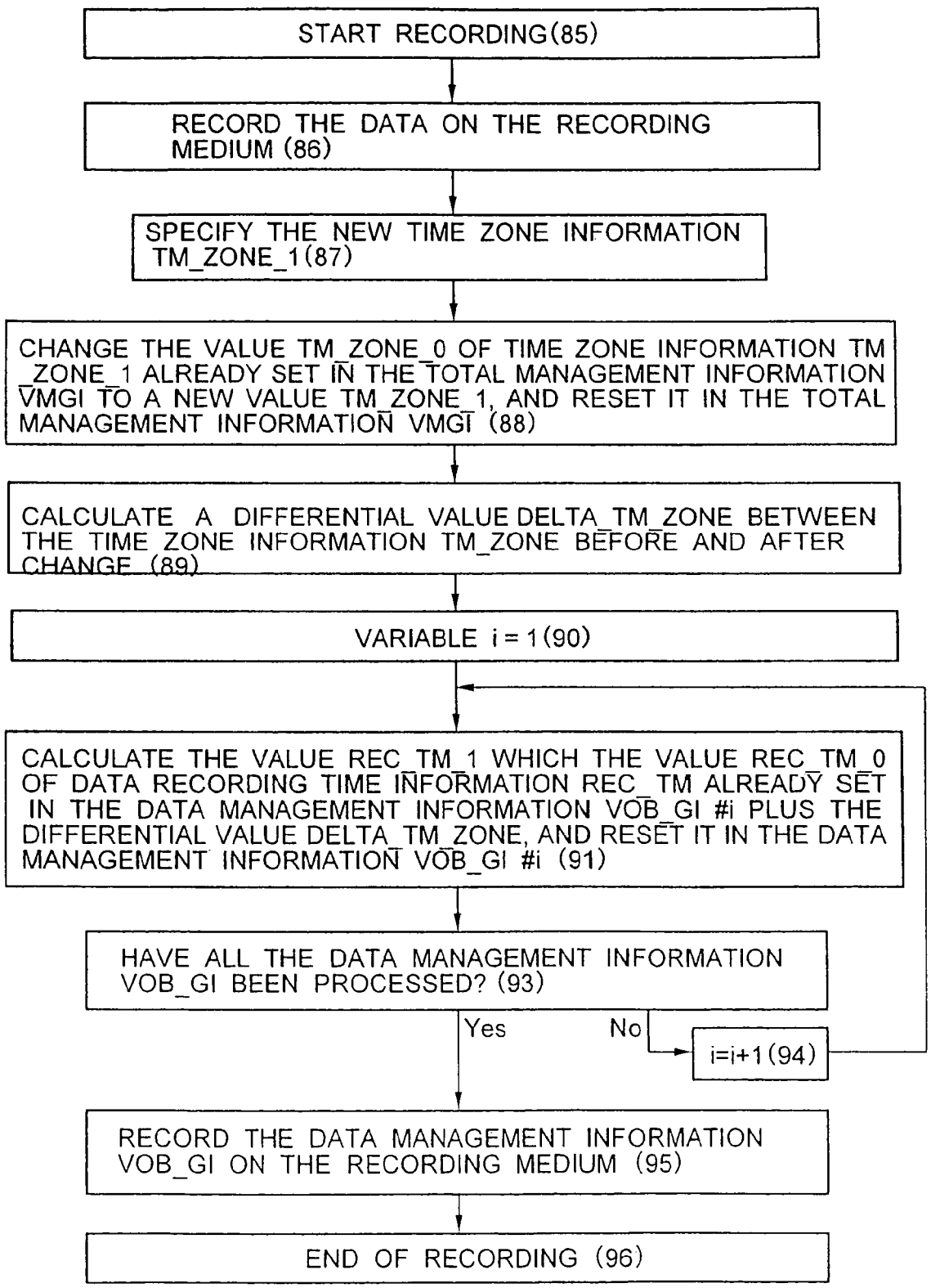
FIG. 17 is a diagram showing one example of the recording method for use with the invention.

FIG. 17 shows a method for embodying the operation of the recorder as shown in FIG. 7 with a program as one example of the recording method for use with the invention. In FIG. 17, the recording operation is started at step (85). Then the data such as the image or voice is recorded on the recording medium at step (86), as previously described and shown in FIG. 13. Subsequently, the new time zone information TM_ZONE_1 is specified at step (87). Then, the value (TM_ZONE_0) of the time zone information TM_ZONE (12) already set in the total management information VMGI(10) is changed to the new value (TM_ZONE_1) which is then reset in the total management information VMGI(10) at step (88). Along with this, the differential value DELTA_TM_ZONE (i.e., TM_ZONE_1−TM_ZONE_0) between the time zone information TM_ZONE before and after change is calculated at step (89). A variable i is prepared, and initialized to 1 at step (90). Then, the loop process is entered. At step (91), the value REC_TM_1 which is the value REC_TM_0 of the data recording time information REC_TM(13-*i*) already set in the i-th data management information VOB_GI(11-*i*) plus the differential value DELTA_TM_ZONE is calculated, and reset in the data management information VOB_GI(11-*i*). At step (93), it is determined whether or not all the data management information VOB_GI(11-*i*) is processed. If all processed, the operation proceeds to step (95), or otherwise, the value of the variable i is incremented by 1 at step (94), and operation transfers to step (91). Lastly, the data management information VOB_GI(11) is recorded on the recording medium (1) at step (95). The recording is ended at step (96). Herein, the new time zone information TM_ZONE_1 at step (87) can be specified by selecting one of plural pieces of time zone information (e.g., two-byte value) and storing it in the memory, for example.

Figure 18:
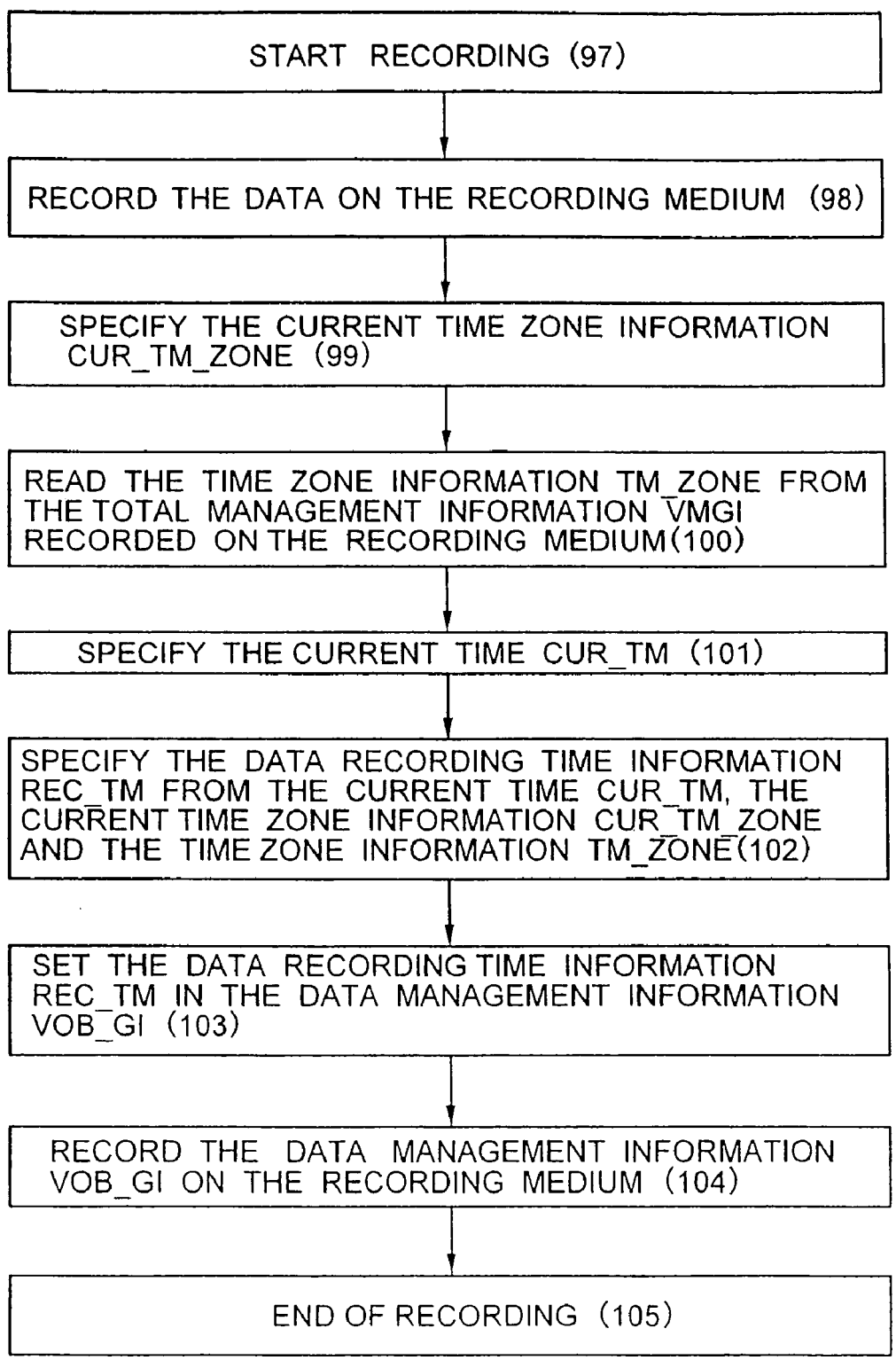
FIG. 18 is a diagram showing one example of the recording method for use with the invention.

FIG. 18 shows a method for embodying the operation of the recorder as shown in FIG. 8 with a program as one example of the recording method for use with the invention. In FIG. 18, the recording operation is started at step (97). Then the data such as the image or voice is recorded on the recording medium at step (98), as previously described and shown in FIG. 13. Subsequently, the current time zone information CUR_TM_ZONE is specified at step (99). Then, the time zone information TM_ZONE (12) is read from the total management information VMGI(10) recorded on the recording medium (1) at step (100). At step (101), the current time CUR_TM is specified. At step (102), the data recording time information REC_TM(13) is specified from the current time CUR_TM, the current time zone information CUR_TM_ZONE, and the time zone information TM_ZONE(12). At step (103), the data recording time information REC_TM(13) is set in the data management information VOB_GI(11). At step (104), the data management information VOB_GI(11) is recorded on the recording medium (1). The recording operation is ended at step (105). Herein, at step (99), the current time zone information CUR_TM_ZONE can be specified by selecting one of plural pieces of time zone information (e.g., two-byte value) and storing it in the memory, for example. At step (101), the current time information REC_TM can be specified by generating the CUR_TM value (e.g., five-byte value) with a timer (clock) which can progress in a unit of second, for example. At step (102), the data recording time information REC_TM(13) can be specified by making an arithmetic operation of (REC_TM value=CUR_TM value+TM_ZONE value−CUR_TM_ZONE value).

Figure 19:
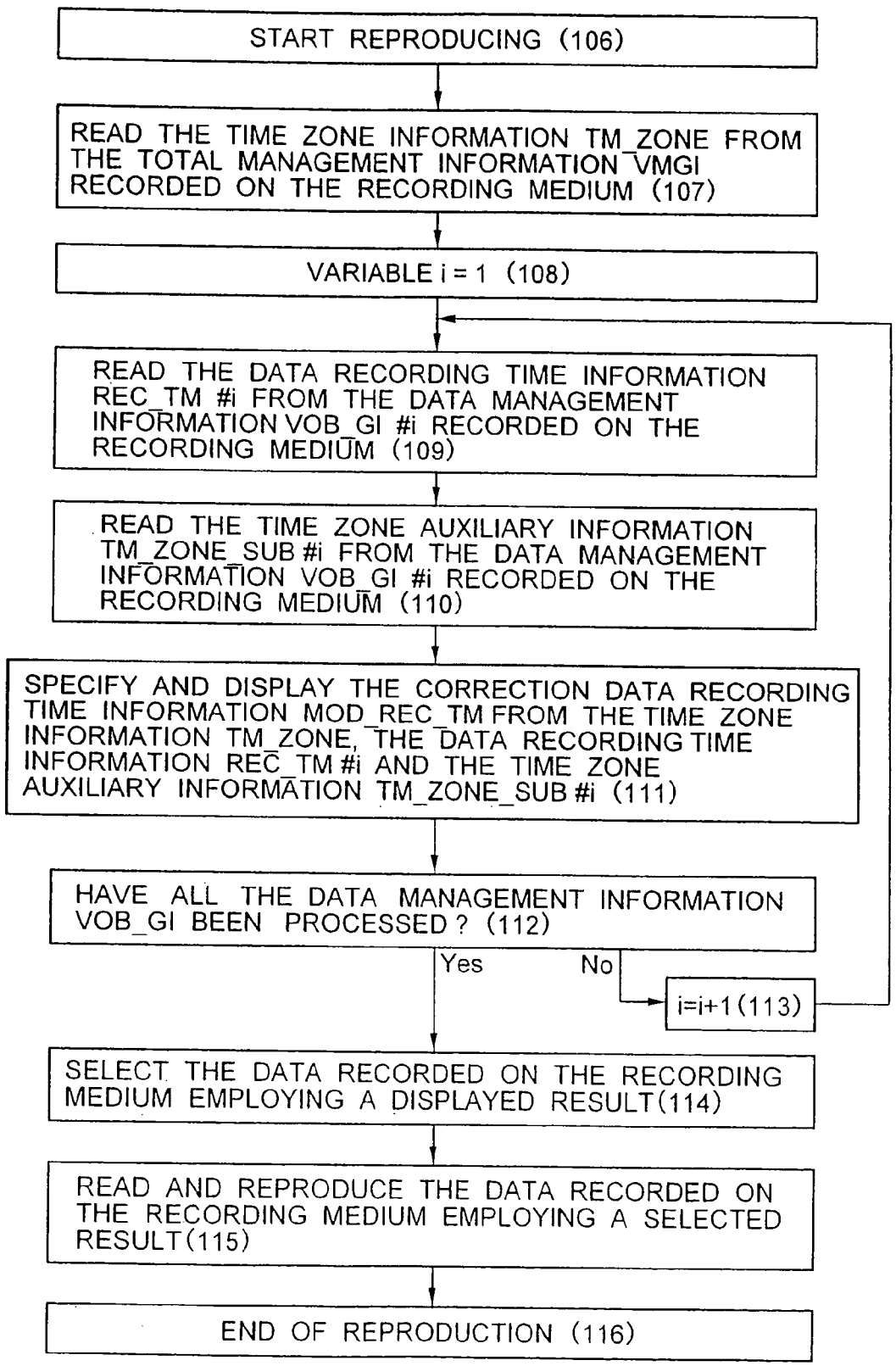
FIG. 19 is a diagram showing one example of a reproducing method for use with the invention.

FIG. 19 shows a method for embodying the operation of the reproducing device as shown in FIG. 10 with a program as one example of the reproducing method for use with the invention. In FIG. 19, the reproducing operation is started at step (106). Then, the time zone information TM_ZONE(12) is read from the total management information VMGI(10) recorded on the recording medium (1) at step (107). A variable i is prepared, and initialized to 1 at step (108). Then, the loop process is entered. At step (109), the data recording time information REC_TM(13-*i*) is read from the i-th data management information VOB_GI(11-*i*) recorded on the recording medium (1). At step (110), the time zone auxiliary information TM_ZONE_SUB(14-*i*) is read from the i-th data management information VOB_GI(11-*i*) recorded on the recording medium (1). Subsequently, at step (111), an arithmetic operation of (MOD_REC_TM value=REC_TM value+TM_ZONE_SUB value−TM_ZONE value) is performed, using the time zone information TM_ZONE(12), the data recording time information REC_TM(13-*i*) and the time zone auxiliary information TM_ZONE=SUB(14-*i*) to specify the correction data recording time information MOD_REC_TM and display it in a format as shown in FIG. 9. At step (112), it is determined whether or not all the data management information VOB_GI(11) are processed. If all processed, the operation proceeds to step (114), or otherwise, the value of the variable i is incremented by 1 at step (113), and the operation transfers to step (109). At step (114), the data recorded on the recording medium (1) is selected using the displayed result. At step (115), the data recorded on the recording medium (1) is read and reproduced using the selected result. The reproducing operation is ended at step (116).

Figure 20:
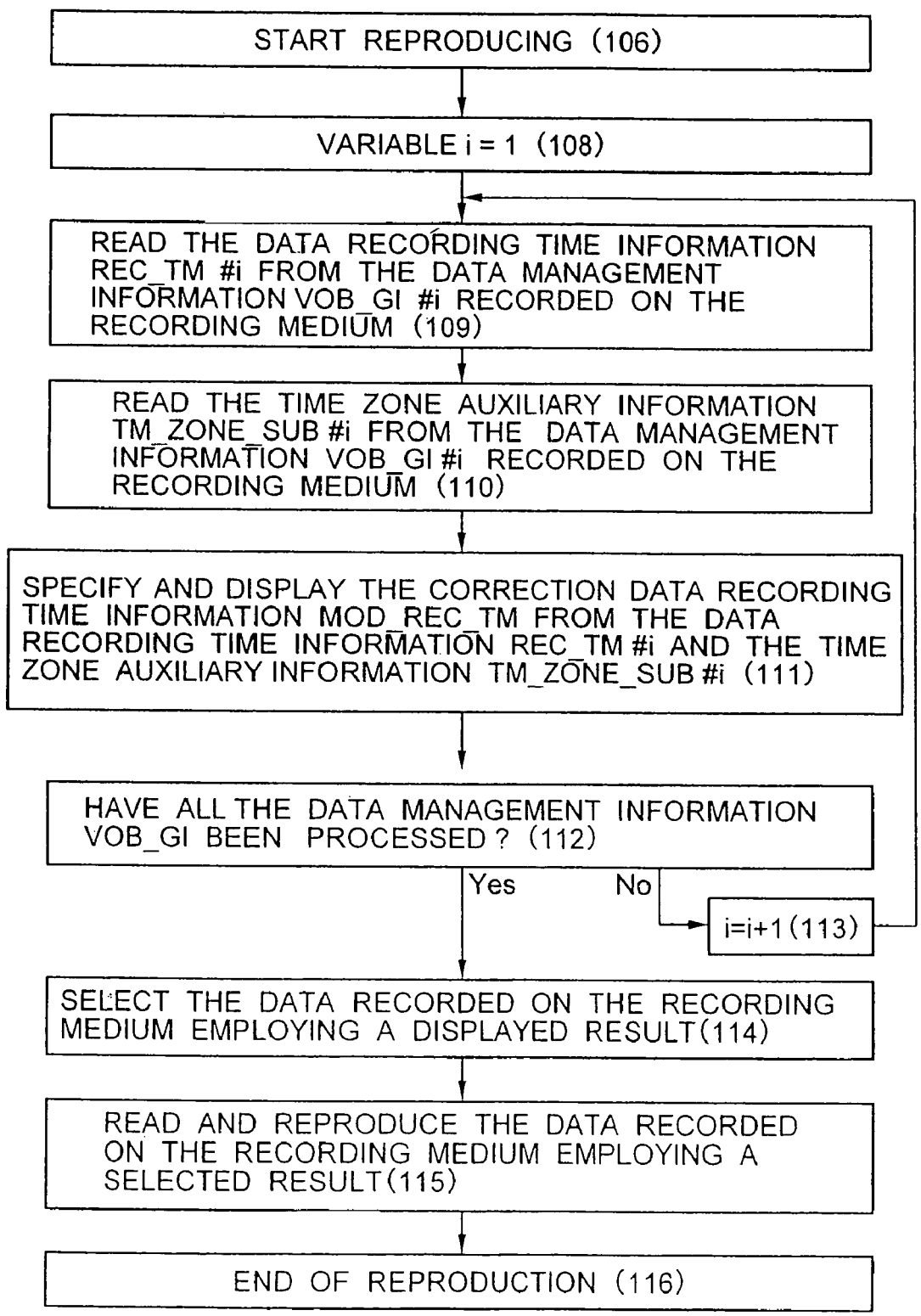
FIG. 20 is a diagram showing one example of the reproducing method for use with the invention.

FIG. 20 shows a method for embodying the operation of the reproducing device as shown in FIG. 11 with a program as one example of the reproducing method for use with the invention. In FIG. 20, the reproducing operation is started at step (106). Then, a variable i is prepared, and initialized to 1 at step (108). Then, the loop process is entered. At step (109), the data recording time information REC_TM(13-*i*) is read from the i-th data management information VOB_GI(11-*i*) recorded on the recording medium (1). At step (110), the time zone auxiliary information TM_ZONE_SUB(14-*i*) is read from the i-th data management information VOB_GI(11-*i*) recorded on the recording medium (1). Subsequently, at step (111), an arithmetic operation of (MOD_REC_TM value=REC_TM value+TM_ZONE_SUB value) is performed, using the data recording time information REC_TM (13-*i*) and the time zone auxiliary information TM_ZONE=SUB(14-*i*) to specify the correction data recording time information MOD_REC_TM and display it in a format as shown in FIG. 9. At step (112), it is determined whether or not all the data management information VOB_GI (11) are processed. If all processed, the operation proceeds to step (114), or otherwise, the value of the variable i is incremented by 1 at step (113), and the operation transfers to step (109). At step (114), the data recorded on the recording medium (1) is selected using the displayed result. At step (115), the data recorded on the recording medium (1) is read and reproduced using the selected result. The reproducing operation is ended at step (116)

Figure 21:
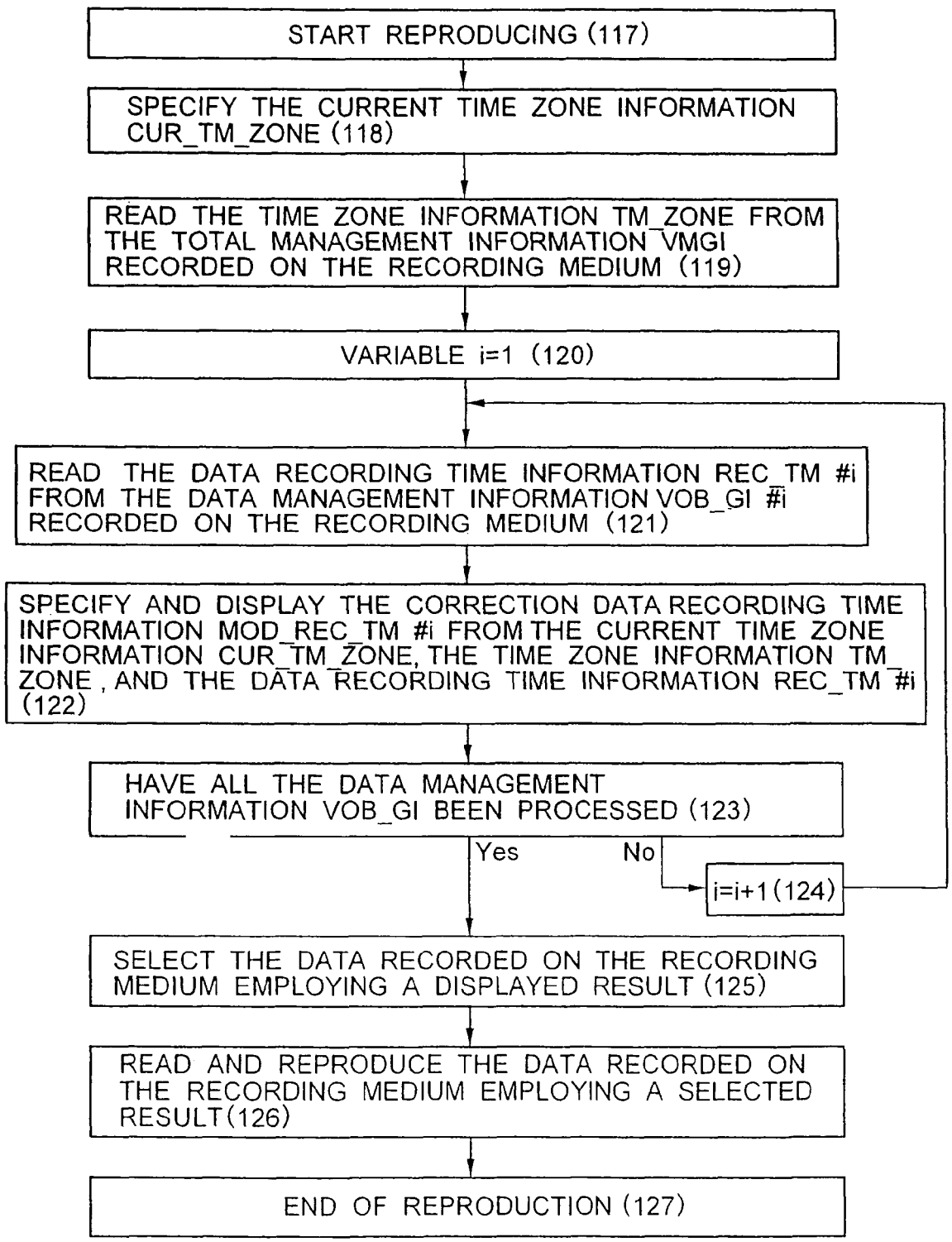
FIG. 21 is a diagram showing one example of the reproducing method for use with the invention.

FIG. 21 shows a method for embodying the operation of the reproducing device as shown in FIG. 12 with a program as one example of the reproducing method for use with the invention. In FIG. 21, the reproducing operation is started at step (117). Then, the current time zone information CUR_TM_ZONE is specified at step (118). Then, the time zone information TM_ZONE(12) is read from the total management information VMGI(10) recorded on the recording medium (1) at step (119). A variable i is prepared, and initialized to 1 at step (120). Then, the loop process is entered. At step (121), the data recording time information REC_TM (13-*i*) is read from the i-th data management information VOB_GI(11-*i*) recorded on the recording medium (1). Subsequently, at step (122), an arithmetic operation of (MOD_REC_TM value=REC_TM value+CUR_TM_ZONE value−TM_ZONE value) is performed, using the current time zone information CUR_TM_ZONE, the time zone information TM_ZONE(12), and the data recording time information REC_TM(13-*i*) to specify the correction data recording time information MOD_REC_TM and display it in a format as shown in FIG. 9. At step (123), it is determined whether or not all the data management information VOB_GI(11) are processed. If all processed, the operation proceeds to step (125), or otherwise, the value of the variable i is incremented by 1 at step (124), and the operation transfers to step (121). At step (125), the data recorded on the recording medium (1) is selected using the displayed result. At step (126), the data recorded on the recording medium (1) is read and reproduced using the selected result. The reproducing operation is ended at step (127).

What is claimed is:

1. A reproduction apparatus for reproducing an optical recording medium recorded with N (N is an integer) pieces of data, data management information for managing each of the data, and total management information for managing the N pieces of data, wherein the total management information includes time zone information (TM_ZONE) indicating a time difference between a world standard time (Greenwich Mean Time) and a standard time in a predetermined location, wherein the data management information includes recording time zone information (REC_TM_ZONE) at a time of recording the data, indicating a time difference between the world standard time (Greenwich Mean Time) and a standard time in a location where the data have been recorded; data recording time information (REC_TM) indicating a recording time when the data has been recorded in accordance with the standard time indicated by the time zone information (TM_ZONE); and a flag indicating whether the recording time zone information (REC_TM_ZONE) at the time of recording the data specifies a time difference from the standard time in the location where the data has been recorded, wherein the reproduction apparatus further includes means for reproducing the data, and specifying means for specifying a local recording time in a location where the data has been recorded, in accordance with the data recording time information (REC_TM), the time zone information (TM_ZONE), and the recording time zone information (REC_TM_ZONE) at the data recording time, and wherein the specifying means specifies the local recording time in the location where the data has been recorded, in only a case where the flag indicates that the recording time zone information (REC_TM_ZONE) at the data recording time specifies the time difference from the world standard time (Greenwich Mean Time) in the location where the data has been recorded.

2. A reproduction method for reproducing an optical recording medium, comprising:

reading an optical recording medium recorded with N (N is an integer) pieces of data, data management information for managing each of the data, and total management information for managing the N pieces of data, wherein the total management information includes time zone information (TM_ZONE) indicating a time difference between a world standard time (Greenwich Mean Time) and a standard time in a predetermined location, wherein the data management information includes recording time zone information (REC_TM_ZONE) at a time of recording the data, indicating a time difference between the world standard time (Greenwich Mean Time) and a standard time in a location where the data have been recorded; data recording time information (REC_TM) indicating a recording time when the data has been recorded in accordance with the standard time indicated by the time zone information (TM_ZONE); and a flag indicating whether the recording time zone information (REC_TM_ZONE) at the time of recording the data specifies a time difference from the standard time in the location where the data has been recorded, specifying a local recording time in a location where the data has been recorded, in accordance with the data recording time information (REC_TM), the time zone information (TM_ZONE), and the recording time zone information (REC_TM_ZONE) at the data recording time, and wherein the specifying operation specifies the local recording time in the location where the data has been recorded, in only a case where the flag indicates that the recording time zone information (REC_TM_ZONE) at the data recording time specifies the time difference from the world standard time (Greenwich Mean Time) in the location where the data has been recorded;

wherein the reproduction method including the reading operation, is implemented by a reproducing hardware device.

3. A recording method for recording N (N is an integer) pieces of data, data management information for each of the N pieces of data and total management information for managing the N pieces of data on an optical disk recording medium, comprising:

recording the N pieces of data in a predetermined data area of the optical disk recording medium;

recording time zone information (TM_ZONE) indicating a time difference between a world standard time and a standard time, in a predetermined total management information area of the optical disk recording medium;

recording, on a predetermined data management information area of the optical disk recording medium, recording time zone information (REC_TM_ZONE) at a time of recording data indicating a time difference between the world standard time and the standard time in a location where the data have been recorded, and data recording time information (REC_TM) indicating a time of recording the data in accordance with the standard time indicated by the time zone information (TM_ZONE); and recording, on the data management information area of the optical disk recording medium, a flag indicating whether or not the recording time zone information (REC_TM_ZONE) at the time of recording the data specifies the time difference between the world standard time and the standard time in the location where the data have been recorded;

wherein the recording method including the recording operations, is implemented by a recording hardware device.

* * * * *